(12) United States Patent
Bakshi et al.

(10) Patent No.: US 11,157,958 B2
(45) Date of Patent: Oct. 26, 2021

(54) ASSOCIATING A SINGLE ENTITY WITH MULTIPLE ELECTRONIC DEVICES

(71) Applicant: Invensense, Inc., San Jose, CA (US)

(72) Inventors: Rahul Bakshi, San Jose, CA (US); Ardalan Heshmati, Saratoga, CA (US)

( * ) Notice: Subject to any disclaimer, the term of this patent is extended or adjusted under 35 U.S.C. 154(b) by 1002 days.

(21) Appl. No.: 15/410,694

(22) Filed: Jan. 19, 2017

(65) Prior Publication Data

US 2017/0206559 A1 Jul. 20, 2017

Related U.S. Application Data

(60) Provisional application No. 62/280,550, filed on Jan. 19, 2016.

(51) Int. Cl.
*G06Q 30/00* (2012.01)
*G06Q 30/02* (2012.01)
*H04W 4/021* (2018.01)
*H04L 29/08* (2006.01)
*H04W 8/18* (2009.01)

(52) U.S. Cl.
CPC ..... *G06Q 30/0261* (2013.01); *G06Q 30/0267* (2013.01); *H04L 67/22* (2013.01); *H04W 4/021* (2013.01); *H04W 8/18* (2013.01)

(58) Field of Classification Search
CPC ....... G06Q 30/02–0277; H04W 4/021; H04W 8/18; H04L 67/22
See application file for complete search history.

(56) References Cited

U.S. PATENT DOCUMENTS

| 10,229,429 B2 * | 3/2019 | Dey | G06Q 30/0246 |
| 10,244,057 B2 * | 3/2019 | Fransen | H04L 67/148 |
| 10,281,279 B2 | 5/2019 | Ahmed et al. | |
| 2008/0005313 A1 | 1/2008 | Flake et al. | |
| 2013/0124261 A1 | 5/2013 | Wilder et al. | |
| 2014/0122697 A1 | 5/2014 | Liu et al. | |
| 2014/0244401 A1 | 8/2014 | Doughty et al. | |
| 2015/0312612 A1 | 10/2015 | Shkedi et al. | |
| 2017/0061501 A1 * | 3/2017 | Horwich | G06Q 30/0275 |
| 2018/0112983 A1 | 4/2018 | Ahmed et al. | |

FOREIGN PATENT DOCUMENTS

JP 3737791 B2 * 1/2006 ............. H04W 4/02

OTHER PUBLICATIONS

IP.com Prior art Database "Smarter Profile selection for Portable Devices" Apr. 11, 2014 (Year: 2014).*
Crosswise, "Cross-Device Learning Center", Published Jan. 17, 2016, 5 pgs.

* cited by examiner

*Primary Examiner* — Raquel Alvarez

(57) ABSTRACT

In a method of associating a single entity with multiple electronic devices, a server accesses user data collected via internet communications with a plurality of electronic devices. Each item of user data includes a location signature and a unique identifier. The server determines an intersection of location between two electronic devices of the plurality of electronic devices based on the user data accessed from the two electronic devices. The user data is accessed from a first of the two electronic devices has a first unique identifier that is different than a second unique identifier of the user data accessed from a second of the two electronic devices. Based on the intersection of location, a single entity is associated with both the first unique identifier and the second unique identifier.

25 Claims, 16 Drawing Sheets

1000

1010 ACCESSING, BY A SERVER, USER DATA COLLECTED VIA INTERNET COMMUNICATIONS WITH A PLURALITY OF ELECTRONIC DEVICES, WHEREIN EACH ITEM OF USER DATA INCLUDES A LOCATION SIGNATURE AND A UNIQUE IDENTIFIER

↓

1020 DETERMINING, BY THE SERVER, AN INTERSECTION OF LOCATION BETWEEN TWO ELECTRONIC DEVICES OF THE PLURALITY OF ELECTRONIC DEVICES BASED ON THE USER DATA ACCESSED FROM THE TWO ELECTRONIC DEVICES, WHEREIN THE USER DATA ACCESSED FROM A FIRST OF THE TWO ELECTRONIC DEVICES HAS A FIRST UNIQUE IDENTIFIER THAT IS DIFFERENT THAN A SECOND UNIQUE IDENTIFIER OF THE USER DATA ACCESSED FROM A SECOND OF THE TWO ELECTRONIC DEVICES

↓

1030 BASED ON THE INTERSECTION OF LOCATION, ASSOCIATING A SINGLE ENTITY WITH THE FIRST UNIQUE IDENTIFIER AND THE SECOND UNIQUE IDENTIFIER

1040 UTILIZING THE SINGLE ENTITY ASSOCIATION TO RETARGET ADVERTISING FROM THE FIRST ELECTRONIC DEVICE TO THE SECOND ELECTRONIC DEVICE, WHEREIN THE ADVERTISING IS BASED ON AN ACTIVITY ASSOCIATED WITH USER DATA OF THE FIRST UNIQUE IDENTIFIER

AGGREGATING FIRST STORED BEHAVIORAL DATA OF SAID FIRST UNIQUE IDENTIFIER WITH SECOND STORED BEHAVIORAL DATA OF THE SECOND UNIQUE IDENTIFIER TO CREATE AN AGGREGATED BEHAVIOR DATA FOR SAID SINGLE ENTITY
1050

1000 continued

FILTERING SAID USER DATA TO REMOVE USER DATA WITH A LOCATION SIGNATURE THAT DOES NOT MEET AT LEAST ONE PREDEFINED CRITERION
1060

ASSOCIATING A SINGLE ENTITY WITH MULTIPLE ELECTRONIC DEVICES

CROSS REFERENCE TO RELATED APPLICATIONS—PROVISIONAL

This application claims priority to and benefit of U.S. Provisional Patent Application No. 62/280,550 filed on Jan. 19, 2016 entitled "Integrating User Data Across Multiple Devices for Effective Advertisement Retargeting" by Rahul Bakshi and Ardalan Heshmati, which is assigned to the assignee of the present application. The disclosure of U.S. Provisional Patent Application No. 62/280,550 is hereby incorporated herein by reference in its entirety.

BACKGROUND

Advances in technology have enabled the introduction of electronic devices that feature an ever increasing set of capabilities. Smartphones, for example, now offer sophisticated computing and sensing resources together with expanded communication capability, digital imaging capability, Internet searching and accessing capability, navigating capability, and user experience capability. Likewise, tablets, wearables, media players, Internet connected devices (which may or may not be mobile), and other similar electronic devices have shared in this progress and often offer some or all of these capabilities. Because of this, electronic devices have become ingrained in various aspects of daily life, and a single entity (e.g., a person, or else a small group of people such as a person and their significant other or a family unit) may utilize more utilize two or more electronic devices.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 10A-10D illustrate a flow diagram of an example method of associating a single entity with multiple electronic devices, in accordance with various aspects of the present disclosure.

DESCRIPTION OF EMBODIMENTS

Figure 1:
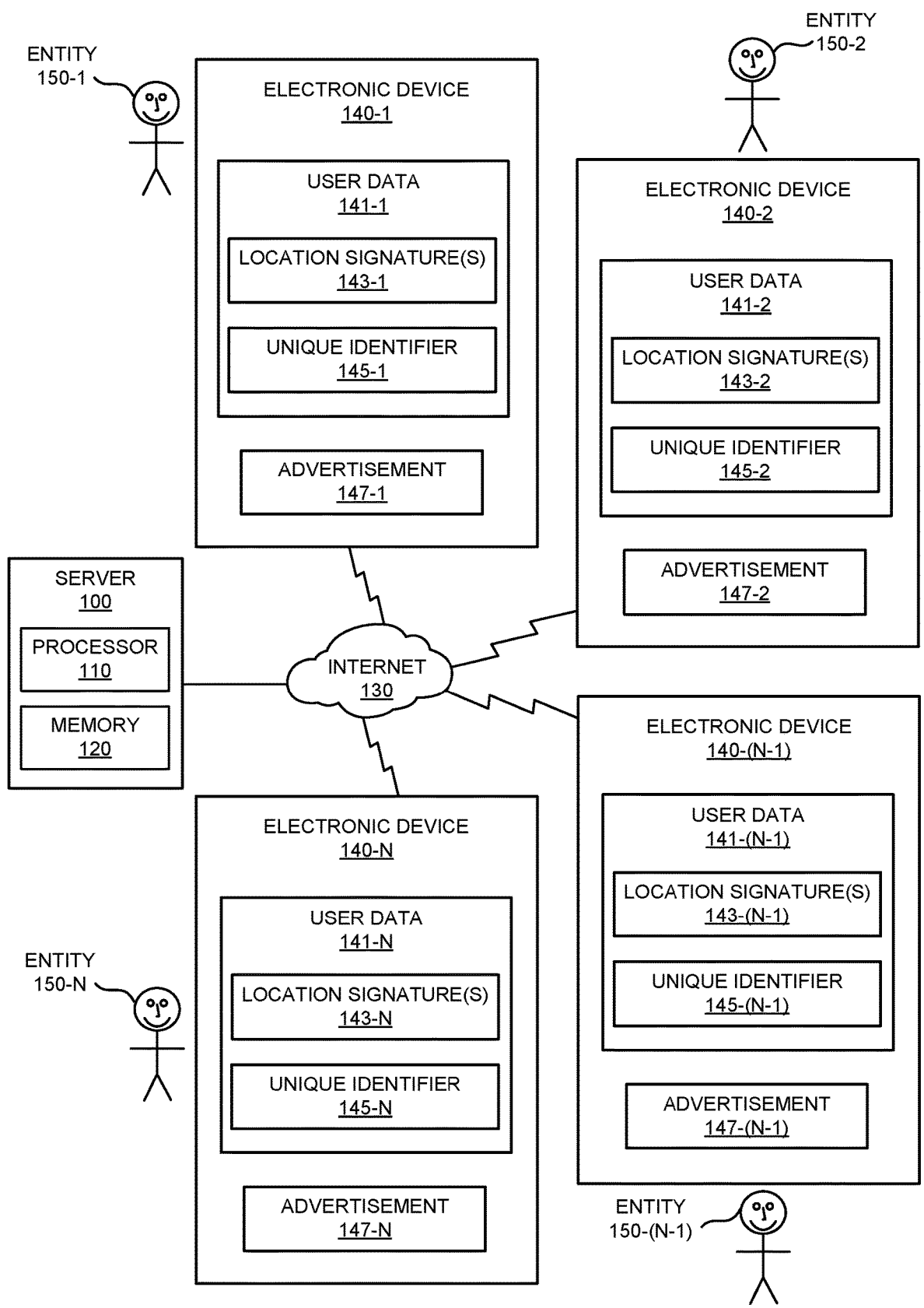
FIG. 1 shows a block diagram of an example server which is configured to access user data collected via internet communications with a plurality of electronic devices, in accordance with various aspects of the present disclosure.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

An entity that uses an electronic device may be a person or a small group of persons. Some examples of a small group of persons include: a couple that has an association such as a couple in a romantic or domestic partnership; and a family unit. Conventionally, multiple electronic devices are associated with a single entity if the single entity identifies itself on each of the multiple electronic devices, such as by separately signing in with the same user identification to a single account while using each of the multiple electronic devices. However, much online and offline activity with an electronic device does not require any sort of sign-in that would actively identify the entity using the electronic device in a way that could be used to associate the entity of the identity of the entity with another electronic device. Various aspects of this disclosure comprise a server (or other computer system), non-transitory computer readable media, and/or method which associates a single entity with multiple electronic devices, without reliance on the entity actively providing information such as a sign-in or user identification that can be used to associate the entity with two or more of the multiple devices. That is, based on location signatures from the multiple devices, it can be determined that the devices are associated with a single entity even when the identity of that single entity is known on none of the multiple devices that are associated with the single entity.

Discussion begins with a description of notation and nomenclature and is followed by a description of example electronic devices. Discussion continues with description of an example server (or other computer system) which is configured to access user data collected via internet communications with a plurality of electronic devices. Examples of entity based groupings within the memory of the server are described along with examples of location signatures that may be received from the plurality of electronic devices. An example association of a single entity with multiple electronic devices is presented, and an aggregation of behavioral data for the multiple electronic devices that are associated with the single entity is depicted and described. Examples of advertising retargeting within the multiple electronic devices that have been associated with a single entity are described. Parsing of aggregated behavioral data of the multiple electronic devices that have been associated with a single entity is described along with targeting advertisement based on interests determined by the parsing. Finally, operation of the server and components thereof are then further described in conjunction with description of an example method of associating a single entity with multiple electronic devices.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "collecting," "determining," "associating," "utilizing," "aggregating," "parsing," "targeting," "retargeting," "filtering," "processing," "storing," or the like, refer to the actions and processes of server (or other computer system configured to perform these actions) and/or one or more components thereof such as: one or more processors, memory, or a combination thereof. The server/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example servers and electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, cause a processor and/or other components to perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or processors of a server or other computer system configured to perform the methods and techniques described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, such as a plurality of microprocessors of the same or different types as one another.

Example Electronic Device(s)

By "electronic device," what is meant is an electronic device that is capable of being coupled with the Internet in a wired or wireless manner such that user data of the electronic device can be accessed by a remote server or computer system (either directly or indirectly). In some embodiments, the electronic device also includes a display or audio output via which remotely directed advertising (visual, audible, or some combination) can be presented to the using entity of the electronic device. An electronic device as described herein may be mobile or non-mobile. Some non-limiting examples of a non-mobile devices, which are typically fixed in a location and coupled with electric utility provided power when used, include: a desktop computer that is coupled with the Internet, a smart television that is coupled with the Internet, an internet enabled appliance (e.g., a refrigerator, voice activated internet connected electronic assistant, etc.), and/or fixed internet of things (IOT) device. In some embodiments, an electronic device as described herein is mobile. What is meant by being mobile is that the electronic device is mounted in a vehicle that moves or is a handholdable and/or wearable device (e.g., a watch, a headband, a pendant, an armband, a belt-mounted device, eyeglasses, a fitness device, a health monitoring device, etc.) that can be held in the hand of a using entity and/or worn on the person of a using entity. Often a mobile electronic device can sense or determine its location and/or orientation, when moved in space by a using entity. A handholdable/wearable electronic device may, without limitation, be: a mobile phone (e.g., a cellular phone, a phone running on a local network, or any other telephone handset), a personal digital assistant (PDA), a pedometer, a personal activity and/or health monitoring device, a video game player, a video game controller, a navigation device, a mobile internet device (MID), a personal navigation device (PND), a digital still camera, a digital video camera, a tablet computer, a notebook or laptop computer, a head mounted display (HMD), a virtual reality of augmented reality display, a portable music player, a portable video player, a portable multimedia player, a remote control, a wristwatch, a mobile internet of things device, or a combination of one or more of these electronic devices.

Example Server

FIG. 1 shows a block diagram of an example server 100 which is configured to access user data collected via internet communications 130 with a plurality of electronic devices 140, in accordance with various aspects of the present disclosure. Server 100 includes at least one processor 110 and a memory 120 (which may include any form or combination of volatile or non-volatile data storage). An electronic device 140 (e.g., 140-1, 140-2 . . . 140-(N-1), 140-*n*) typically includes a processor and memory and may include a display and/or audio output, none of which is depicted.

Electronic device 140 may contain sensors to determine the location, orientation, and/or context of the device. An electronic device 140 is configured to couple with and communicate via the Internet 130, or any other type of network suitable for the invention. The depicted electronic devices 140 are wirelessly coupled with the Internet, but in some embodiments one or more electronic devices 140 may additionally or alternatively be coupled via wireline connection to the Internet. It should be appreciated that in some embodiments server 100 may communicate with a particular electronic device 140 to acquire or provide data, and that in some embodiments server 100 may access data about a particular electronic device 140 from or supply data about a particular electronic device 140 to an intermediary server (such as an advertising server, search engine server, merchant server, web server, or the like).

Electronic device 140-1 includes user data 141-1 that is generated based upon the interactions of entity 150-1 with electronic device 140-1. As discussed previously, an entity such as entity 150-1 may be a single person user or a small group of persons (e.g., spouses; a couple that has an association such a romantic or domestic relationship; and/or two or more members of a family unit). User data 141-1 includes at least one location signature 143-1 and a unique identifier 145-1. Electronic device 140-1 includes an advertisement 147-1 that has been communicated to electronic device 140-1 via the Internet 130, and which is based on one or more of the online and offline activity of electronic device 140-1.

Electronic device 140-2 includes user data 141-2 that is generated based upon the interactions of entity 150-2 with electronic device 140-2. As discussed previously, an entity such as entity 150-2 may be a single person user or a small group of persons (e.g., spouses; a couple that has an association such a romantic or domestic relationship; and/or two or more members of a family unit). User data 141-2 includes at least one location signature 143-2 and a unique identifier 145-2. Electronic device 140-2 includes an advertisement 147-2 that has been communicated to electronic device 140-2 via the Internet 130, and which is based on one or more of the online and offline activity of electronic device 140-2.

Electronic device 140-(N-1) includes user data 141-(N-1) that is generated based upon the interactions of entity 150-(N-1) with electronic device 140-(N-1). As discussed previously, an entity such as entity 150-(N-1) may be a single person user or a small group of persons (e.g., spouses; a couple that has an association such a romantic or domestic relationship; and/or two or more members of a family unit). User data 141-(N-1) includes at least one location signature 143-(N-1) and a unique identifier 145-(N-1). Electronic device 140-(N-1) includes an advertisement 147-(N-1) that has been communicated to electronic device 140-(N-1) via the Internet 130, and which is based on one or more of the online and offline activity of electronic device 140-(N-1).

Electronic device 140-N includes user data 141-N that is generated based upon the interactions of entity 150-N with electronic device 140-N. As discussed previously, an entity such as entity 150-N may be a single person user or a small group of persons (e.g., spouses; a couple that has an association such a romantic or domestic relationship; and/or two or more members of a family unit). User data 141-N includes at least one location signature 143-N and a unique identifier 145-N. Electronic device 140-N includes an advertisement 147-N that has been communicated to electronic device 140-N via the Internet 130, and which is based on one or more of the online and offline activity of electronic device 140-N.

Some non-limiting examples of a location signature 143 include: a Media Access Control (MAC) address; an Internet Protocol (IP) address; geolocation data; a beacon scan; and a cellular tower identification. A MAC address may be the MAC address assigned to a router or Wi-Fi device, or other mechanism through which an electronic device communicates to and from the Internet. An IP address may be a numerical label assigned to the electronic device by the network that it utilized to communicate via the Internet, or may be a numerical label assigned to a device on a local network through which the electronic device communicates via the internet. Geolocation data may include information such as a latitude and longitude or other geolocation information that is determined by a device by utilizing received navigation signals (which may be from one or more satellite transmissions such as GNSS, one or more terrestrial transmissions, or some combination). Geolocation data may also refer to location data indoors, such as within a venue, store, or building. As such, the geolocation data may be generated through means adapted to provide indoor location data. In one aspect, electronic device 140 may receive location data from a beacon using short-range personal area network communications (i.e., Bluetooth, NFC, RF or the like), WI-FI communication, or other means of short range communication. For example, an iBeacon or other similar beacon transmission involves transmitting an identification signal such as a universally unique identifier from a known beacon location. The beacon signal is received by a proximity sensing receiver of an electronic device 140 and is used to locate the electronic device in the proximity of the beacon's short transmission range. In another aspect of the invention, geolocation data may be based on data from motion sensor signals, received from motion sensors located within electronic device 140. These techniques may be referred to as Pedestrian Dead-Reckoning (PDR) techniques, and may be used alone, or in combination with other means of determining the location, such as e.g., beacons mentioned above. Some example methods of determining indoor geolocation data using PDR techniques may be found in co-pending, commonly owned U.S. patent application Ser. No. 15/385,412, filed Dec. 20, 2016, which is hereby incorporated by reference in its entirety. The location data as determined, for example, by one or more of the techniques describes above may have some uncertainty or error, and as such the location signatures may have some margin of error, maximum accuracy, or associated range. In some embodiments, when server 100 creates a geo-polygon from one or more location signatures, the location of a particular electronic device associated with geo-polygon is attributed to be within the geographic bounds of the geo-polygon which has been sized to encompass the margin of error/accuracy limitation/associated range.

Based on the location signatures, geo-polygons may be defined, for example by server 100, through grouping, clustering or otherwise combining the geolocation data of the location signatures. A geo-polygon may be defined as a closed shape defined by a connected sequence of coordinate/location pairs, where the first and last coordinate pair are the same and all other pairs are difference. As such, a geo-polygon represents the geographical bounds wherein entity 150/electronic device 140 has been with a certain level of confidence. The geo-polygon may be constructed using various statistics techniques known to the person skilled in the art, such as for example: density-based spatial clustering of applications with noise (DBSCAN), K-means clustering, k-meloids clustering, expectation-maximization algorithm, density clustering, optics algorithm, chameleon, or other suitable clustering/grouping techniques. Since a geo-polygon represents a collection of location signatures, that geo-polygon also represents a certain time range, over which the location signatures were obtained. This time range may be varied depending on various specifications (e.g., size, accuracy) for the geo-polygon. Geo-polygons may be dynamic and change as the included location signatures change. For example, the geo-polygons may be based on a sliding time window and only incorporate location signatures within that time window. In various embodiments, the time window may have a range of a few minutes, one or more hours, one or more days, one or more weeks, or even one or more months. The server may know what type of device the location signatures are received from, and then adapt the time window accordingly. The geo-polygons may be constructed using all available location signatures, or the location signatures may be filtered prior to inclusion. For example, the geo-polygons may only be based on locations where electronic device 140 has been for a certain threshold period of time, and as such may exclude location data when electronic device 140 is moving. For example, in some embodiments, location signatures may be filtered out when it is determined that they are associated with an electronic device that is moving beyond a certain threshold velocity). In one aspect, some (range of) locations within the geo-polygons may be more or less important than others. In some embodiments, some or all of the processing to determine the geo-polygons may also be performed by one or more electronic devices 140. For example, an electronic device 140 may determine geo-polygons based on the location signatures available it, and then transmit the determined geo-polygons to server 100 or to a computer system that can be accessed by server 100. Server 100 can combine the received geo-polygons with additional geo-polygons or location signatures, which may not have been available to the device 140.

A particular advertisement 147 may be directed to a particular electronic device 140, via the Internet, such as from a server of a website, from an advertising server, from a search engine, or the like. An advertisement 147 directed to a particular electronic device 140 is often targeted based on online activity and/or offline activity of the particular electronic device 140.

Online activity comprises any activity that is initiated by a user on an Internet connected electronic device 140, such as websites visited or topics searched with a search engine. Online activity may be tracked, for example, by a server or an internet cookie on the electronic device 140 that performs the activity. For example, if using entity 150-1 utilized electronic device 140-1 to search for a particular merchant or to visit the web site for the particular merchant, an advertisement 147-1 for the merchant may be directed to a web browser or some other application on electronic device 140-1.

Offline activity comprises any activity that is initiated by a user in the physical world while carrying, wearing or otherwise physically bringing along the electronic device. Some examples of offline activity include, but are not limited to, visiting a location, driving, walking in a store, viewing a product in a store. For example, if entity 150-1 takes electronic device 140-1 to a location, such as a merchant's place of business, and electronic device 140-1 determines the location using e.g., PDR and/or beacons (and beacon scans therefrom), then electronic device 140-1 may be targeted with an advertisement that is pertinent to that location (i.e., for the merchant at the location or for a type of merchandise for sale at or near that location).

It should be appreciated that a combination of online and offline activity of a particular electronic device 140 may be utilized to create a consolidated profile to target an advertisement for the particular electronic device 140. For example, if entity 150-1 utilizes a web browser to search for dishwashers and then it is determined that entity 150-1 is at the location of an appliance merchant or else has geolocation data that indicates that electronic device 140-1 is at or near an appliance merchant, an advertisement 147-1 for a dishwasher available at the appliance merchant may be targeted to electronic device 140-1.

When a single entity is associated with multiple electronic devices 140, according to techniques describes herein, an advertisement 147 for or from one of the electronic devices may be retargeted to another of the electronic devices. Similarly, online and offline behavioral data from two or more of the devices that have been associated with the single entity, according to techniques described herein, may be utilized to determine an interest toward which an advertisement can be targeted to one or more of the multiple electronic devices 140.

Figure 2:
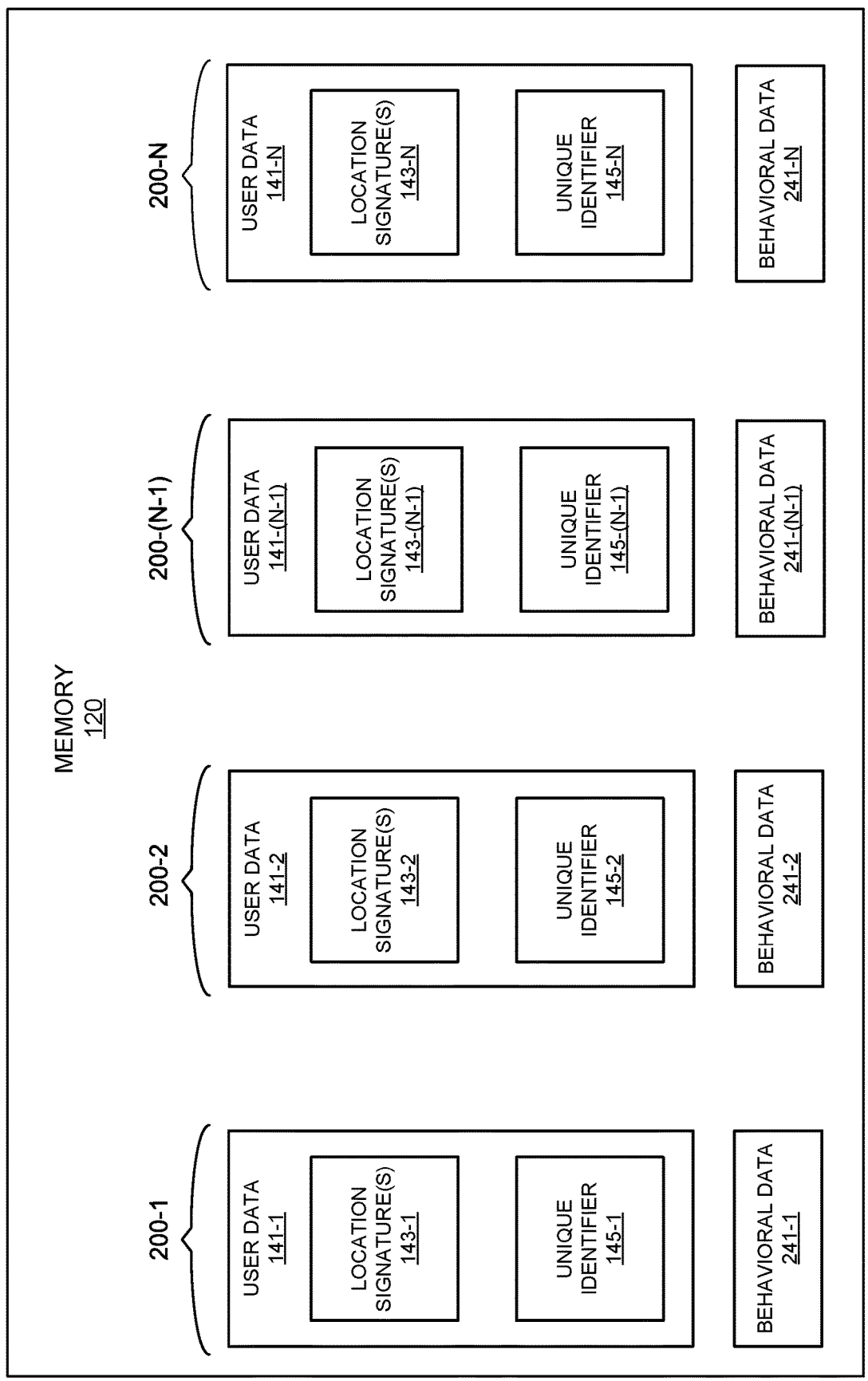
FIG. 2 shows a block diagram of example entity based groupings of data within memory of the server of FIG. 1, in accordance with various aspects of the present disclosure.

FIG. 2 shows a block diagram of example entity based groupings of data 200 (200-1, 200-2 . . . 200-(N−1), 200-N) within memory 120 of the server of FIG. 1, in accordance with various aspects of the present disclosure. For example, entity based grouping of data 200-1 is associated with entity 150-1 and electronic device 140-1 and includes user data 141-1 and behavioral data 241-1 collected by server 100 via internet communications that have occurred with electronic device 140-1; entity based grouping of data 200-2 is associated with entity 150-2 and electronic device 140-2 and includes user data 141-2 and behavioral data 241-2 collected by server 100 via internet communications that have occurred with electronic device 140-2; entity based grouping of data 200-(N−1) is associated with entity 150-(N−1) and electronic device 140-(N−1) and includes user data 141-(N−1) and behavioral data 241-(N−1) collected by server 100 via internet communications that have occurred with electronic device 140-(N−1); and entity based grouping of data 200-N is associated with entity 150-N and includes user data 141-N and behavioral data 241-N collected by server 100 via internet communications that have occurred with electronic device 140-N. It should be appreciated that the user data 141 may be directly or indirectly acquired by server 100. For example, in some embodiments, the internet communications may include user data 141 and/or behavioral data 241 collected directly via internet communications between server 100 and a particular electronic device 140, where the user data is accessed (retrieved or received) during such internet communications. In some embodiments, the internet communications may include user data 141 and/or behavioral data 241 collected indirectly by server 100, such as via internet communications between a particular electronic device and another internet connected server (e.g., a web server, a search engine server, and an advertising server, among others), where server 100 subsequently accesses (retrieves or receives) this user data 141.

Example Location Signatures

Figure 3A:
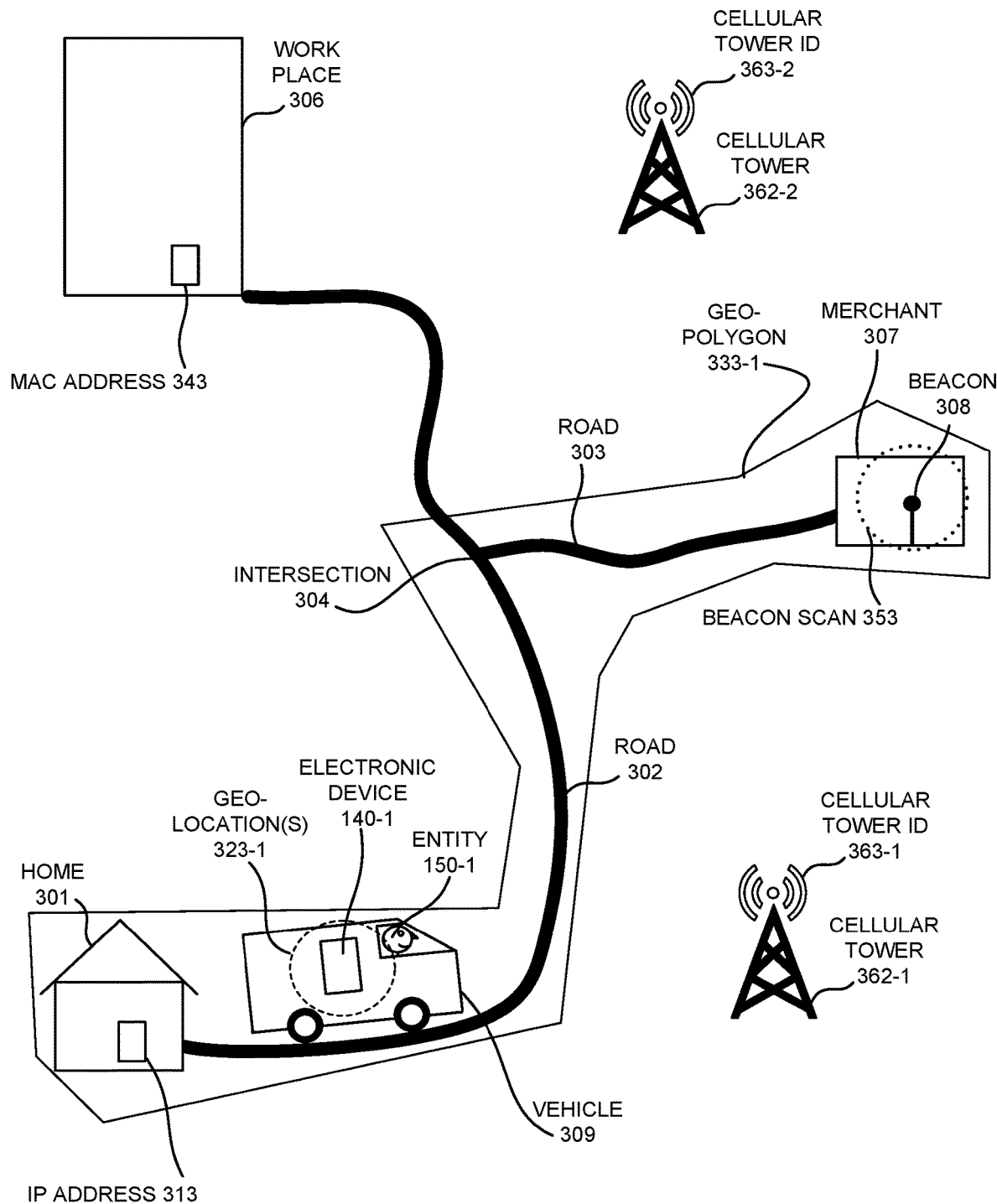
FIG. 3A illustrates some examples of location signatures of an electronic device, in accordance with various aspects of the present disclosure.

FIG. 3A illustrates some examples of location signatures 143 (IP address 313 location signature, geo-location(s) 323-1 location signature(s), cellular tower identification 363 (363-1 and 363-2) location signatures, and/or beacon scan 353 location signatures) of an electronic device 140-1, in accordance with various aspects of the present disclosure. In the interests of brevity and clarity, FIG. 3A illustrates only one electronic device, electronic device 140-1, and discusses location signatures 143 that may be recorded and utilized to form geo-polygon 333-1. The creation of geo-polygon 333-1 can be performed using a clustering algorithm such as k-means clustering or another data clustering algorithm (clustering will be further explained in conjunction with FIGS. 4A and 4B) or by other mechanisms. For purposes of the example of FIG. 3A, electronic device 140-1 is a tablet computer with a GNSS receiver enabled, cellular communications capability enabled, WI-FI communications capability enabled, and short-range personal area network communications capability enabled. FIG. 3A depicts three locations: a home 301 a work place 306, and a place of business of a merchant 307 (e.g., a store, restaurant, coffee shop, barber, drycleaner, etc.). Roads 302 and 303 connect the three locations and also intersect one another at intersection 304.

When electronic device 140-1 is located at home 301, it stores and/or provides one or more location signatures in the form of the IP address 313 that is assigned to the modem through which electronic device 140-1 access the Internet while in at home 301.

For purposes of the example of FIG. 3A, entity 150-1 drives vehicle 309 over roads 302 and 303 from home 301 to merchant 307 with electronic device 140-1, stopping on the way at intersection 304. Entity 150-1 takes electronic device 140-1 into merchant 307. While inside merchant 307, electronic device 140-1 receives a personal area network based beacon scan 353 from a beacon 308 (such as an iBeacon) installed at merchant 307 and "checks in" on a social media account as visiting merchant 307. Because of this, electronic device 140-1 stores or provides in its internet communications a location signature in the form of unique information (e.g., a universal unique identifier) received in beacon scan 353. It should be appreciated that beacon scan 353 and beacon 308 have been previously associated with the physical address of work place 306.

For purposes of the example of FIG. 3A, after shopping at merchant 307, entity 150-1 drives vehicle 309 over roads 303 and 302 from merchant 307 to home 301 with electronic device 140-1 and electronic device 140-1, stopping on the way at intersection 304. While driving, several instant messages (i.e., text messages or the like) are received at electronic device 140-1, causing receipt of cellular tower identifications 363-1 and 363-2 from cellular towers 362-1 and 362-2 which were utilized to send and receive signals to provide the instant messages. These cellular tower IDs are stored and/or provided as location signatures by electronic device 140-1. Entity 150-1 takes electronic device 140-1 into home 301, where it remains overnight and again stores or provides IP address 313 as a location signature.

After acquiring the various location signatures provided by electronic device 140-1 in FIG. 3A, in some embodiments, server 100 creates geo-polygon 333-1 to represent the location of electronic device 140-1 over a period of time. The period of time may be several minutes, a day, several days, several weeks, or longer, and the geo-polygon 333-1 may be continuously revised over time. It should also be appreciated that location signatures 143 are typically accompanied by a date time group or time stamp which provides attributes a fourth dimension of time to such location signatures, and thus a geo-polygon 333 that is created by server 100 may include an associated time component. In this example, geo-polygon 333-1 is created using all the available location signatures. In some embodiments, a filtering is applied to the location signatures before creating geo-polygon 333-1. For example, the filtering may remove location signatures corresponding to situations where electronic device 140-1 was moving (above a certain threshold). The motion of device 140-1 may be derived from subsequent location signatures, speed sensors, motion sensors, or any other appropriate means. As such, the remaining location signatures refer to locations where entity 150-1 spends at least a certain amount of time (with device 140-1). Although not illustrated, applying such filtering would result, in this example, in a geo-polygon 333 encircling home 301 and another geo-polygon 333 encircling merchant 307.

Figure 3B:
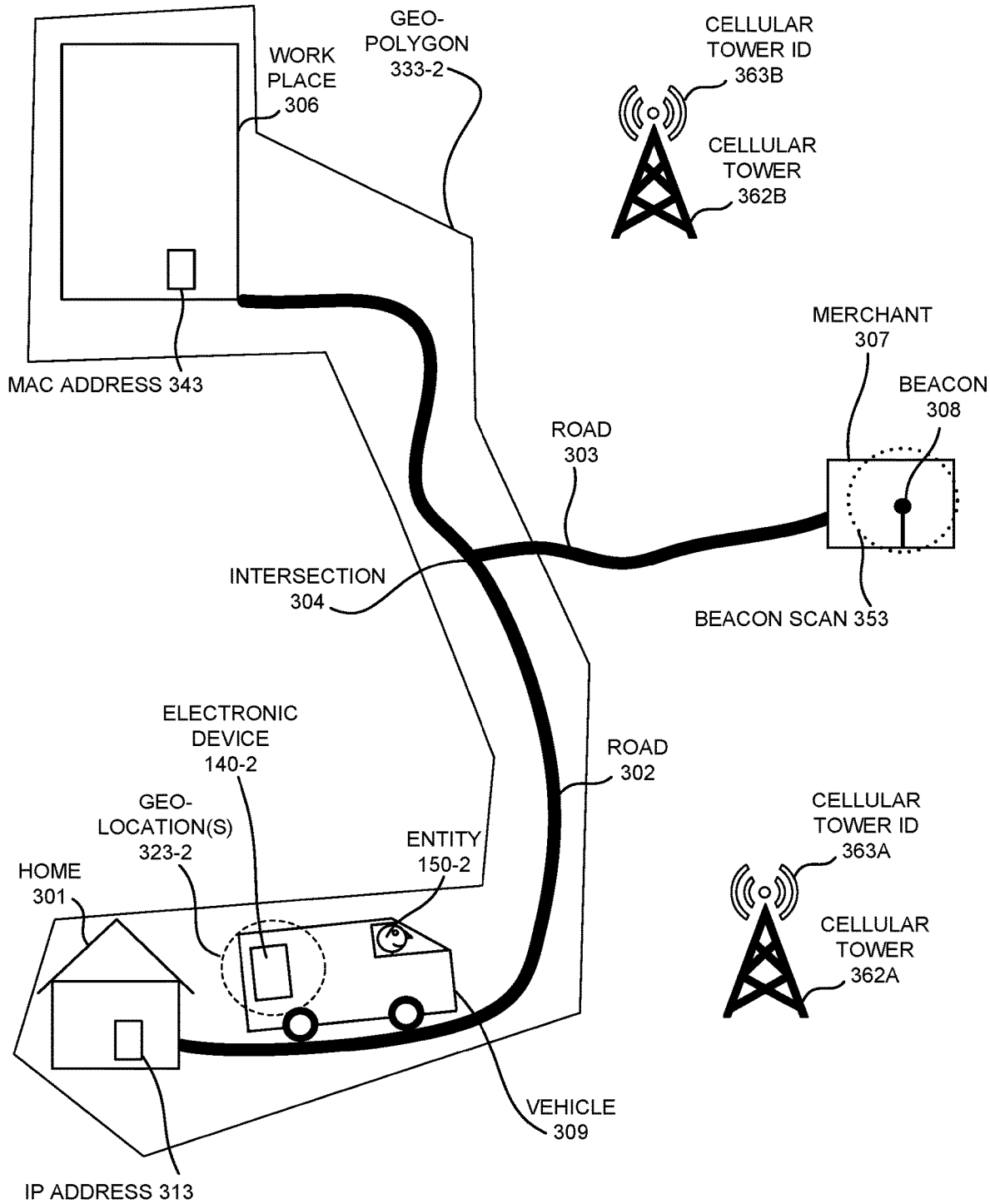
FIG. 3B illustrates some examples of location signatures of another electronic device, in accordance with various aspects of the present disclosure.

FIG. 3B illustrates some examples of location signatures 143 (IP address 313 location signature, geo-location(s) 323-2 location signature(s), cellular tower identification 363 (363-2 and 363-2) location signatures, and/or MAC address 343) of an electronic device 140-2, in accordance with various aspects of the present disclosure. In the interests of brevity and clarity, FIG. 3B illustrates only one electronic device, electronic device 140-2, and discusses location signatures 143 that may be recorded and utilized to form geo-polygon 333-2. The creation of geo-polygon 333-2 can be performed using a clustering algorithm such as k-means clustering or another data clustering algorithm (clustering will be further explained in conjunction with FIGS. 4A and 4B) or by other mechanisms. For purposes of the example of FIG. 3B, electronic device 140-2 is a smart phone with a Global Navigation Satellite System (GNSS) receiver enabled, cellular communications capability enabled, WI-FI communications capability enabled, and short-range personal area network communications capability enabled. FIG. 3B depicts three locations: a home 301 a work place 306, and a place of business of a merchant 307 (e.g., a store, venue, restaurant, coffee shop, barber, drycleaner, etc.). Roads 302 and 303 connect the three locations and also intersect one another at intersection 304.

When electronic device 140-2 is located at home 301, it stores and/or provides one or more location signatures in the form of the IP address 313 that is assigned to the modem through which electronic device 140-2 access the Internet while in at home 301.

When entity 150-2 travels away from home 301 in vehicle 309, the GNSS receiver in electronic device 140-2 can actively receive signals from GNSS satellites and determine a geo-location 323-2 for electronic device 140-2 at a level of accuracy at which it is capable of operating. The respective electronic device 140-2 thus stores and/or provides location signatures in the form of geo-coordinates such as longitudes and latitudes for a particular GNSS determined geo-location 323-2 of electronic device 140-2. It should be appreciated that in some instances a location signature in the form of geo-location 323-2 from a GNSS receiver may be a particular set of coordinates, and that server 100 or the source electronic device 140 may transform these coordinates into a geo-polygon that is sized in part based on the level of accuracy (e.g., within 1 meter of actual location, within 10 meters of actual location, within 20 meters of actual location) that a generating GNSS receiver can provide. In FIG. 3B, several GNSS determined geo-locations 323-2 will be generated while vehicle 309 is moving and some geo-locations 323-2 of electronic device 140-2 will be generated while vehicle 309 is stopped and dwells, such as at intersection 304, at a start/end point such as home 301, and/or at a start/end point such as work place 306.

For purposes of the example of FIG. 3B, entity 150-2 drives vehicle 309 from home 301 to work place 306 on road 302 with electronic device 140-2 and electronic device 140-2, stopping on the way at intersection 304. While driving, entity 150-2 makes a cellular phone call with electronic device 140-2, receiving cellular tower identifications 363 (e.g., 363-1 and 363-2 from the various cellular towers 362 (e.g., 362-1 and 362-2) which were utilized to send and receive signals to conduct the phone call. These cellular tower IDs are stored and/or provided as location signatures by electronic device 140-2. Entity 150-2 takes electronic device 140-2 into work place. While inside work place 306, entity 150-2 surfs some websites with electronic device 140-2, to view various refrigerator models, using a WI-FI signal provided by a wireless router with MAC address 343. Because of this, electronic device 140-2 stores or provides in its internet communications a location signature in the form of MAC address 343 which has been previously associated with the physical address of work place 306. Entity 150-2 repeats a similar pattern of activity, in reverse to travel from work place 306 to home 301 at the end of the work day. After arrival at home 301, entity 150-2 takes electronic device 140-2 into home 301, where it remains overnight and again stores or provides IP address 313 as a location signature.

After acquiring the various location signatures provided by electronic device 140-2 in FIG. 3B, in some embodiments, server 100 creates geo-polygon 333-2 to represent the location of electronic device 140-2 over a period of time. The period of time may be several minutes, a day, several days, several weeks, or longer, and the geo-polygon 333-2 may be continuously revised over time. It should also be appreciated that location signatures 143 are typically accompanied by a date time group or time stamp which provides attributes a fourth dimension of time to such location signatures, and thus a geo-polygon 333 that is created by server 100 may include an associated time component. In this example, geo-polygon 333-2 is created using all the available location signatures. In some embodiments, a filtering is applied to the location signatures before creating geo-polygon 333-2. For example, the filtering may remove location signatures corresponding to situations where electronic device 140-2 was moving (above a certain threshold). The motion of device 140-2 may be derived from subsequent location signatures, speed sensors, motion sensors, or any other appropriate means. As such, the remaining location signatures refer to locations where entity 150-2 spends at least a certain amount of time (with device 140-2). Although not illustrated, applying such filtering would result, in this example, in a geo-polygon 333 encircling home 301 and another geo-polygon 333 encircling work place 306.

Figure 3C:
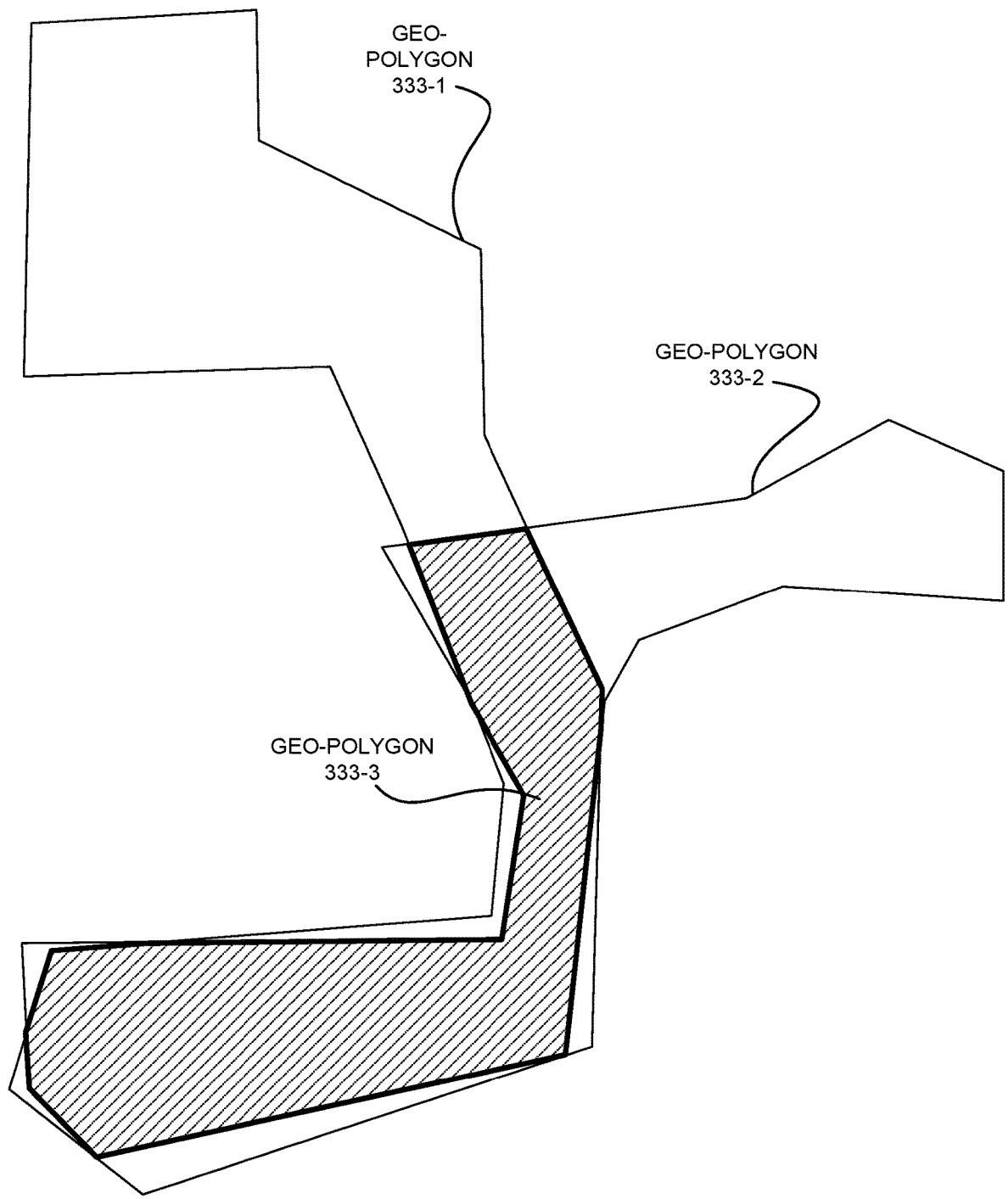
FIG. 3C illustrates an intersection of geo-polygons created by a server from the location signatures of the electronic devices in FIGS. 3A and 3B, in accordance with various aspects of the present disclosure.

FIG. 3C illustrates an intersection of geo-polygons 333-1 and 333-2 created by a server (e.g., server 100) from the location signatures of the electronic devices in FIGS. 3A and 3B, in accordance with various aspects of the present disclosure. By comparing geo-polygons 333-1 and 333-2, server 100 determines an intersecting geo-polygon 333-3 (shown in diagonal cross-hatch), that represents a continuous region of geography within which location signatures for electronic device 140-1 and 140-2 overlap over some period of time. The period of time may be from several minutes to several months. Generally speaking, a longer period of time of overlap is associated with a higher level of confidence that electronic devices 140-1 and 140-2 are being utilized by the same entity. Similarly, a larger geographic area over overlap is associated with a higher level of confidence that electronic devices 140-1 and 140-2 are being utilized by the same entity. FIG. 3C shows that the overlap of the location signatures from devices 140-1 and 140-2, corresponds to the home of entity 150-1/150-2 and road 302 up to intersection 304, since this part of the road is identical when identity 150-1 goes to merchant 307 and entity 150-2 goes to work place 306. Geo-polygon 333-3 may be of uniform density, or some portions of geo-polygon 333-3 may have more importance due to a higher density of location signatures, such as home 301 in this example. Filtering of the location signatures as discussed in relation to FIGS. 3A and 3B, would also influence geo-polygon 333-3. Although not illustrated, such filtering would remove the location signatures when devices 140-1 and 140-2 are moving, and result in a geo-polygon 333 that would encircle home 301, since this is the only location where both device 140-1 and 140-2 have been (while not moving).

It should be appreciated that geo-polygons 333-1 and 333-2 have been computed by server 100 along with numerous other geo-polygons associated, respectively with numerous other electronic devices 140. Through comparison of these numerous geo-polygons, intersecting geo-polygon 333-3 is created, possibly along with numerous other intersecting geo-polygons. Comparing the intersection between numerous geo-polygons with complicated shapes may require a lot of computing resources. In some embodiments, a first step of filtering of the geo-polygons may be performed, so as to decrease the second step of determining the intersection geo-polygons. For example, in the first filtering step, an average location and average size of each polygon may be determined and may be stored as attributes of the geo-polygons. Based on the average location and average size of the polygons, a potential probability of intersection may be determined using less computing resources. This results in a set of candidate geo-polygons corresponding to a set of candidate devices 140, for which an intersection polygon may be determined in a second step. Using the set of candidate geo-polygons, the intersecting geo-polygons can be compared to see which has the greatest overlap in terms of area, time, or some combination thereof. Based on this filtering, server 100 can determine that two or more candidate geo-polygons 333 that are associated with different electronic devices 140, belong to the same entity 150 (or that their using entities 150 can be defined as being the same) with some level of confidence. The level of confidence may be based on the area of the overlap, or may be determined on the time between overlap total time of overlap, time of simultaneous overlay, and/or number of occurrences of the overlap. The larger the overlap, the longer the overlap, the closer in time the overlap, the more simultaneous the overlap, and/or the more times the overlap occurred, the higher the confidence that two or more electronic devices 140 belong to the same entity 150.

Figure 4A:
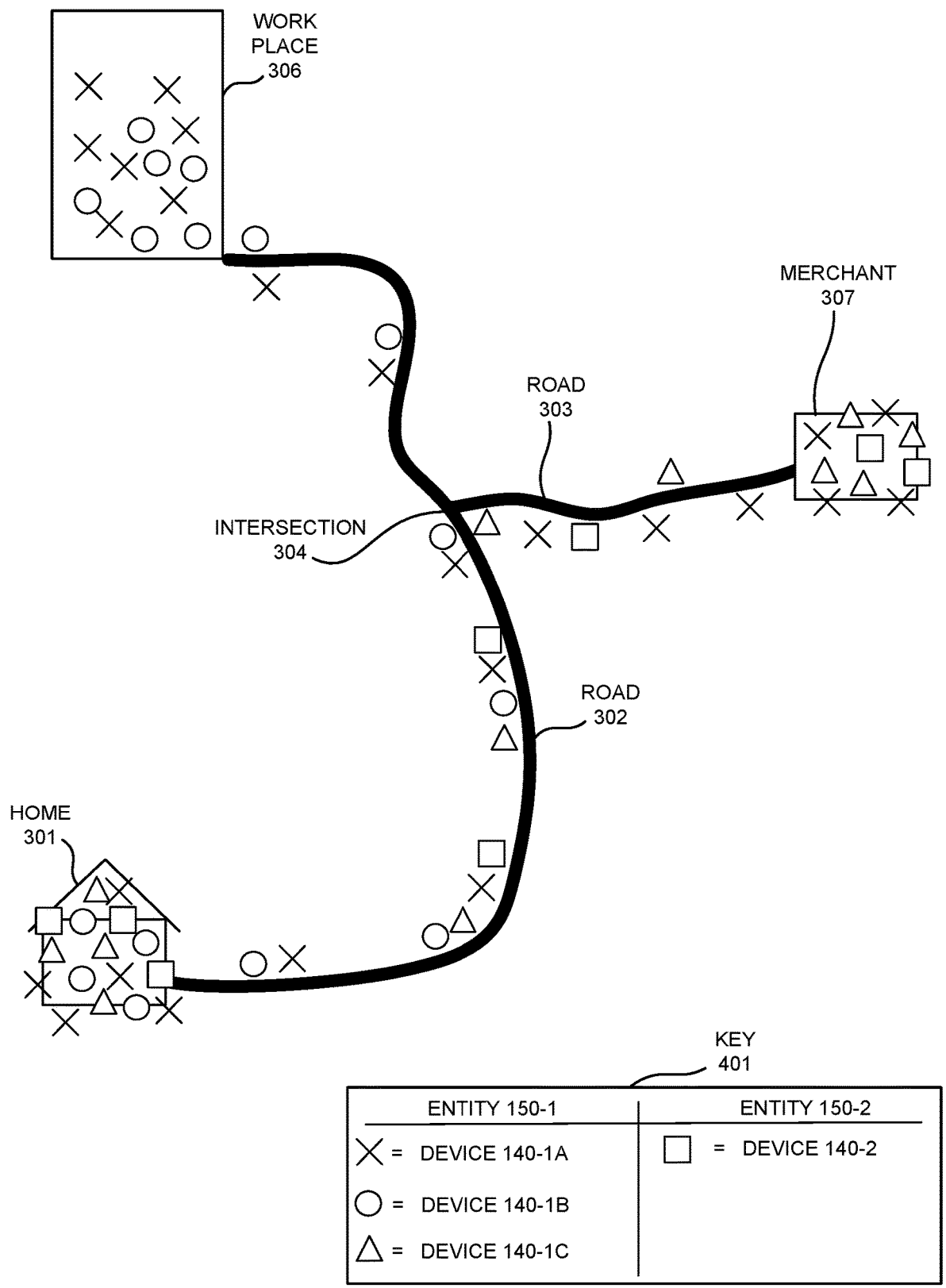
FIGS. 4A-4B illustrate an example of clustering location signatures to associate multiple electronic devices with an entity and to associate entities with one another, in accordance with various aspects of the present disclosure.
Figure 4B:
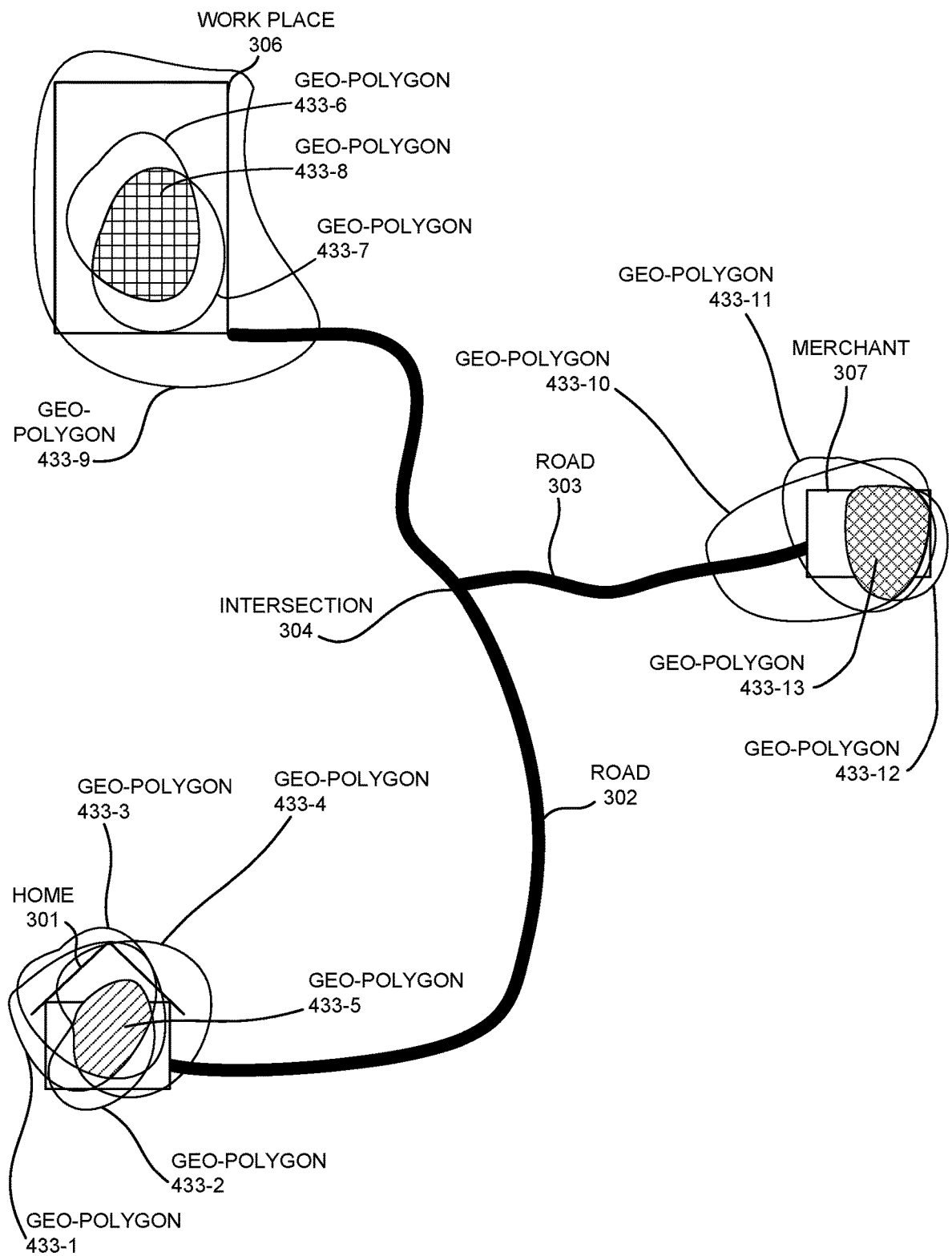

FIGS. 4A-4B illustrate an example of clustering location signatures to associate multiple electronic devices 140 with an entity 150 and to associate multiple entities 150 with one another, in accordance with various aspects of the present disclosure.

Referring now to FIG. 4A, home 301, work place 306, and merchant 307 are again depicted as being coupled by roads 302 and 303. Key 401 illustrates symbols used to represent location signatures received for various electronic devices 140 and the using entity 150 of each of the various devices. The using entities 150 and electronic device associations in key 401 are not known a priori by server 100, but are disclosed here for purposes of clarity of illustration to the reader. In key 401, entity 150-1 utilizes electronic device 140-1A, electronic device 140-1B, and electronic device 140-1C; while entity 150-2 utilizes electronic device 140-2. Per key 401: X's symbolize locations of received location signatures for device 140-1A; circles symbolize locations of received location signatures for electronic device 140-1B; triangles symbolize locations of received location signatures for electronic device 140-1C; and squares represent locations of location signatures for electronic device 140-2.

For purposes of the example of FIGS. 4A and 4B: entity 150-1 is a husband and entity 150-2 is the wife of the husband; device 140-1A is a mobile phone belonging to entity 150-1; device 140-1B is a laptop computer belonging to entity 150-1; electronic device 140-1C is a tablet computer belonging to entity 150-1 and sometimes used by entity 150-2, and electronic device 140-2 is a mobile phone belonging to entity 150-2. In FIGS. 4A and 4B, location signals are received in the same manner in the same places as illustrated and described in conjunction with FIGS. 3A-3C, namely in the form of location signatures associated with the various depicted locations, where the location signatures may comprise, without limitation thereto: MAC addresses, GNSS locations, IP addresses, cellular phone tower identifications, and/or beacon scan identifications. As can be seen there is a cluster of X location signatures, circle location signatures, triangle location signatures, and square location signatures at home 301; a cluster of X location signatures and circle location signatures at work place 306; and a cluster of X location signatures, triangle location signatures, and square location signatures at merchant 307. The depicted location signatures indicate that: mobile phone 140-1A and laptop computer 140-1B are taken from home 301 to work place 306; that mobile phone 140-1A, tablet computer 140-1C; and mobile phone 140-2 are taken from home 301 to merchant 307. Large clusters of various location signatures exist home 301, work place 306, and merchant 307. FIG. 4A also shows the location signatures from the various devices along road 302.

Referring now to FIG. 4B, the clusters of location signatures at home 301, work place 306, and merchant 307 have been replaced with geo-polygons 433. At home 301, server 100 has replaced: the cluster of X location signatures with geo-polygon 433-1, the cluster of circle location signatures with geo-polygon 433-2; the cluster of triangle location signatures with geo-polygon 433-3; and the cluster of square location signatures with geo-polygon 433-4. Crosshatched geo-polygon 433-5 represents the intersection of geo-polygons 433-1, 433-2, 433-3, and 433-4. At work place 306, server 100 has replaced: the cluster of X location signatures with geo-polygon 433-6, and the cluster of circle location signatures with geo-polygon 433-7. Crosshatched geo-polygon 433-8 represents a tight cluster showing the intersection of geo-polygons 433-6 and 433-7. In addition, and as an alternative to geo-polygon 433-6, geo-polygon 433-9 represents a looser representation of the X location signatures and circle locations at or near work place 306. In other words, depending on the clustering parameters, the cluster of X location signatures can be represented as geo-polygon 433-6 when applying strict clustering parameters, and the cluster of X location signatures can be represented as geo-polygon 433-9 when applying looser clustering parameters. The equivalent of geo-polygon 433-9 are not shown for the other cluster for clarity reasons. At merchant 307, server 100 has replaced: the cluster of X location signatures with geo-polygon 433-10, the cluster of triangle location signatures with geo-polygon 433-11; and the cluster of square location signatures with geo-polygon 433-12. Crosshatched geo-polygon 433-13 represents the intersection of geo-polygons 433-10, 433-11, and 433-12.

As discussed in relation to FIG. 3C and FIG. 4B, each geo-polygon 433 may have at least three attributes: 1) an average position of the location signatures that it represents; 2) a dimension that represents one or both of the geographic size of the source location signatures as well as the uncertainty associated with the source location signatures; and 3) an identifier, such as an electronic device 140 with which the geo-polygon 433 is associated.

Based on attributes 1 and 2 the server 100 can determine the candidate devices 140 that may belong to the same entity 150. Based on attributes 1 and 2 server 100 does a first filtering step to select candidate geo-polygons, and in a next step determines intersections between geo-polygons at home 301, at work place 306 and at merchant 307, which are respectively represented by geo-polygons 433-5, 433-8, and 433-13. The intersections represented by geo-polygons 433-5, 433-8, and 433-13 may be used as a confidence factors. For example: geo-polygon 433-5 shows that location signatures for mobile phone 140-1A, laptop computer 140-1B, tablet computer 140-1C, and mobile phone 140-2 overlap at home 301; geo-polygon 433-8 shows that location signatures for mobile phone 140-1A and laptop computer 140-1B overlap at work place 306; and geo-polygon 433-13 shows that location signatures for mobile phone 140-1A, tablet computer 140-1C, and mobile phone 140-2 overlap at merchant 307. The overlap of location signatures for mobile phone 140-1A and laptop computer 140-1B at work place 306 is confirmation and increased confidence of the overlap of location signatures of these electronic devices at home 301. Likewise, the overlap of location signatures for mobile phone 140-1A, tablet computer 140-1C, and mobile phone 140-2 at merchant 307 is a further confirmation and further increase in the confidence of the overlap of location signatures of these electronic devices at home 301. When server 100 notes a plurality of overlaps of a set or subset of the location signatures of electronic devices 140, in the manner illustrated in FIGS. 4A and 4B, this increases the confidence level with which server 100 can determine that two or more electronic devices are associated with the same entity and similarly. In general, the greater the number of intersecting geo-polygons 433, the greater the confidence that electronic their associated electronic devices 140 are used by the same entity 150. The intersection of the geo-polygons from different electronic devices 140 may be compared to an intersection threshold. This threshold may be an absolute size of relative size threshold. Different electronic devices may be linked to a single entity 150 when the intersection is above the intersection threshold. Furthermore, the intersection threshold may be a measure for the confidence level of the association of the different electronic devices 140 to the single entity 150. The confidence level of the intersection or overlap may be below a threshold when comparing electronic devices 140 at a single location, but because there is a certain overlap at multiple locations, the difference electronic devices 140 may still be associated. As such, the applied thresholds may depend on the number of locations where different electronic devices 140 have a certain amount of overlap with one another. The confirmation of association between two or more electronic devices 140 and an entity 150 may be done for identical time periods, or for different time periods, where a threshold may be applied to limit the time difference between the different associations within a (sub) set of electronic devices 140. In some embodiments, the association between two or more electronic devices 140 and an entity 150 may only be performed if intersecting geo-polygons (with a certain confidence) may be determined at more than one location. If several intersecting geo-polygon for a set of electronic devices 140 can be determined, the confidence level for each geo-polygon may be reduced compared to the confidence level required if there were fewer intersecting geo-polygons. In other words, if only a single intersecting geo-polygon for two or more electronic devices 140 can be determined, the overlap and confidence should be high, but if several intersection geo-polygon for two or more electronic devices 140 can be determined, the required overlap and confidence criteria can be less strict.

With respect to FIG. 4B, in one embodiment, server 100 determines based on the overlaps in location signatures at home 301 and at merchant 307 that entities 150-1 and 150-2 are the same entity for purposes of targeting and/or retargeting of advertising. After making such a determination, server 100 may operate to or direct targeting and/or retargeting of advertisements among electronic devices 140-1A, 140-1B, 140-1C, and 140-2 without ever knowing the actual identity or any identifying information (e.g., a username, social media profile, or the like) associated with either entity 150-1 or entity 150-2.

Figure 5A:
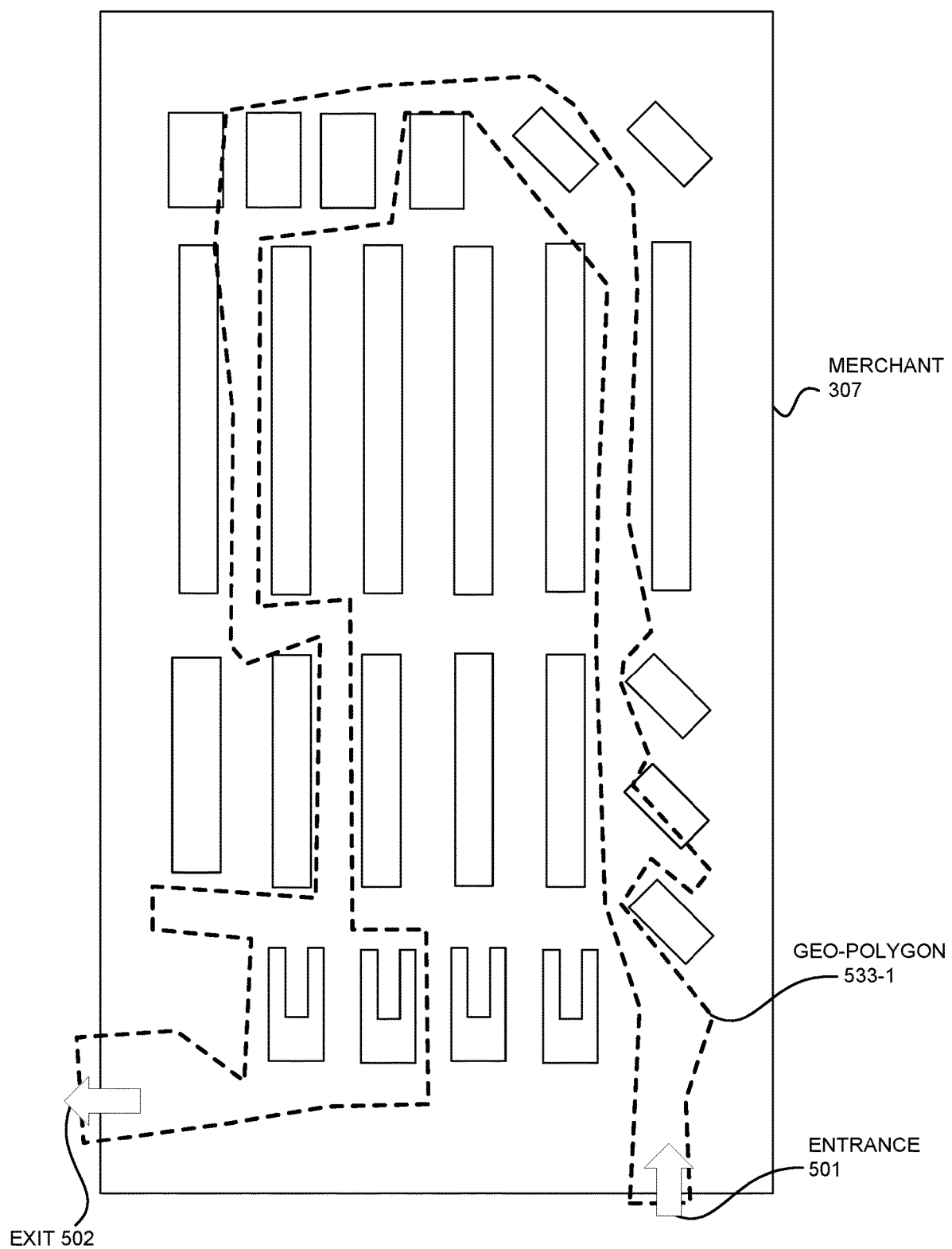
FIGS. 5A-5C illustrate an example of grouping different entities together as a single entity for purposes of targeting and/or retargeting advertising, in accordance with various aspects of the present disclosure.
Figure 5B:
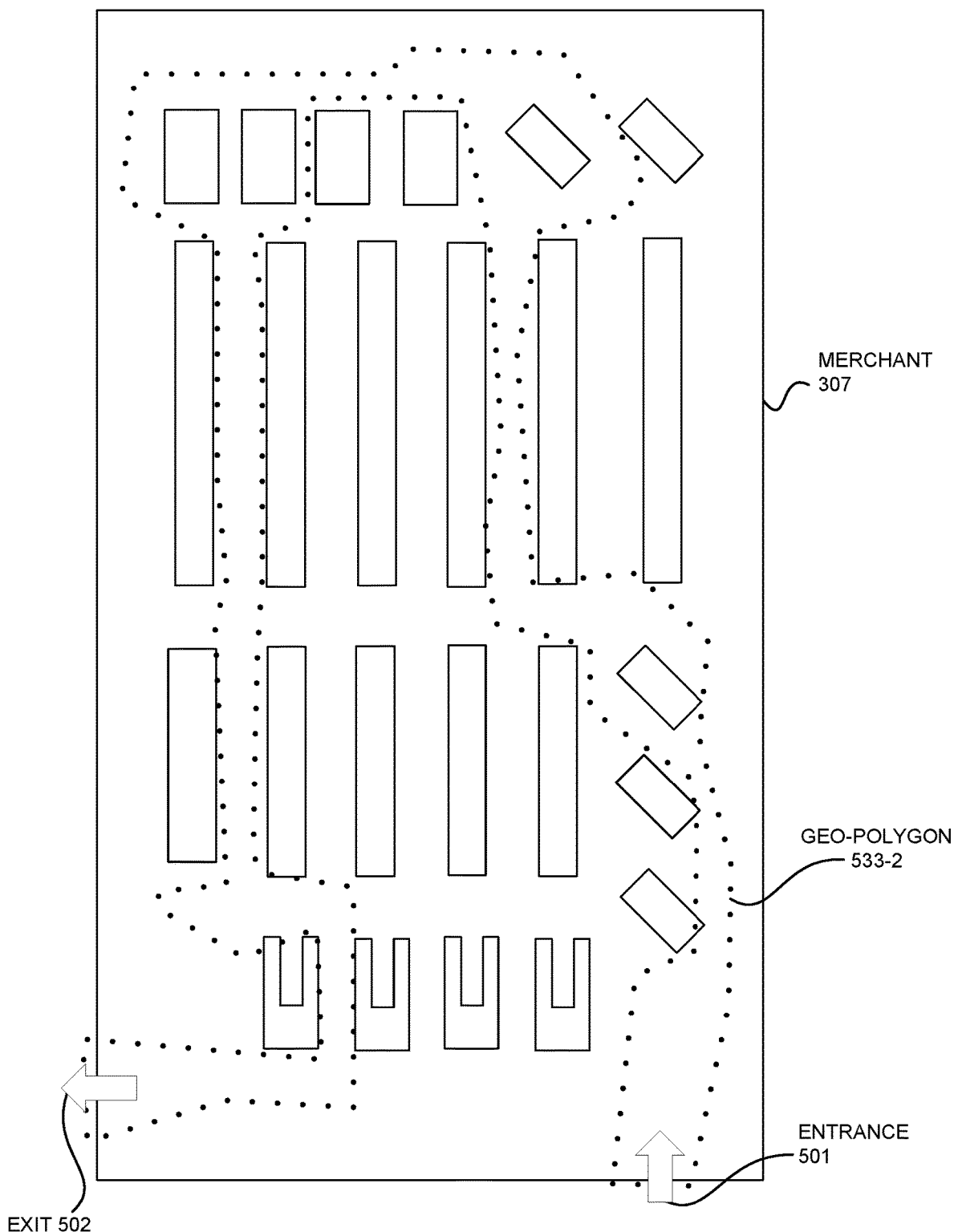
Figure 5C:
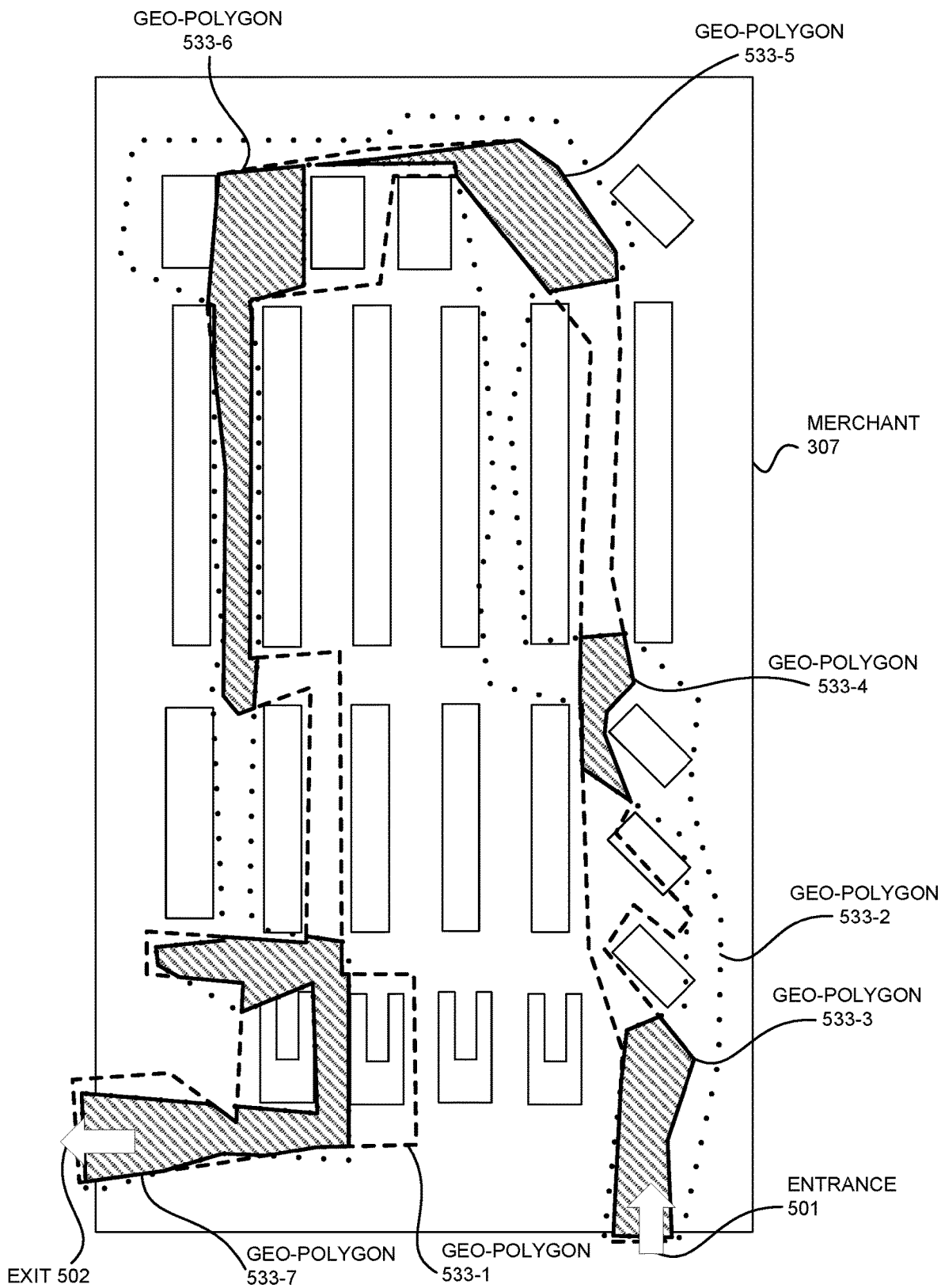

FIGS. 5A-5C illustrate an example of grouping different entities together as a single entity for purposes of targeting and/or retargeting advertising, in accordance with various aspects of the present disclosure. In the example of FIGS. 5A-5C, geo-polygons are created based on location signatures from electronic devices 140 utilized by a first entity 150-1 (a husband) and a second entity 150-2 (wife of the husband) while the entities are shopping together at a merchant 307 (a grocery store in this example). Here location signals are based on PDR and/or beacons and beacon scans. Server 100 generates geo-polygon 333-3 from location signatures accessed for an electronic device being used by entity 150-1, and generates polygon 333-4 from location signatures accessed for an electronic device being used by entity 150-2 (wife). Because entities 150-1 and 150-2 split up and each take shop for different items, but put them in the same shopping cart, the entities have overlapping geo-polygons that overlap in multiple locations, often at the same or nearly the same time.

In FIG. 5A, a first geo-polygon 533-1 associated with the shopping pattern of entity 150-1 is illustrated. Geo-polygon 533-1 represents the clustering of location signature points in the same manner as discussed in relation to FIGS. 4A and 4B.

In FIG. 5B, a second geo-polygon 533-2 associated with the shopping pattern of entity 150-2 is illustrated. Geo-polygon 533-2 represents the clustering of location signature points in the same manner as discussed in relation to FIGS. 4A and 4B.

In FIG. 5C, geo-polygons 533-1 and 533-2 are illustrates along with cross-hatched geo-polygons 533-3, 533-4, 533-5, 533-6, and 533-7 which illustrate intersections between geo-polygons 533-1 and 533-2. The high number of intersecting geo-polygons and their overlap in time in some instances (e.g., at entrance 501 and/or exit 502) allows server 100 to determine with a high level of confidence that entities 150-1 and 150-2 can be considered the same for purposes of targeting and retargeting of advertisements among electronic devices associated (either now, in the past, or in the future) with each of these two entities. In some embodiments, a threshold number of intersection geo-polygons may be defined depending on the required confidence. In some embodiments, the intersection geo-polygons should represent at least a certain predetermined fraction area of the initial geo-polygons 533-1 and 533-2.

It should be appreciated that certain points have more weight such as e.g., entities 150-1 and 150-2 coming in and going out of merchant 307 at the same time or within a certain predefined time span of one another. As such, geo-polygons including certain locations may have more weight in the overall determination. The time span covered by the intersecting geo-polygon may also influence the weight. The longer the different entities are within the same location range, the larger the probability they are together. Thus, a time difference increase between intersecting geo-polygons 533 may lessen the level of confidence with which server 100 can make an association between entities 150-1 and 150-2, while a time difference decrease between intersecting geo-polygons 533 may increase the level of confidence with which server 100 can make an association between entities 150-1 and 150-2. Similarly, a greater number of intersecting geo-polygons 533 increases the level of confidence with which server 100 can make an association between entities 150-1 and 150-2, while a lesser number decreases confidence of intersecting geo-polygons 533 decreases the level of confidence with which server 100 can make an association between entities 150-1 and 150-2. Likewise, a greater overall area over intersection in geo-polygons 533 increases the level of confidence with which server 100 can make an association between entities 150-1 and 150-2, while a lesser overall area of intersection in geo-polygons 533 decreases the level of confidence with which server 100 can make an association between entities 150-1 and 150-2.

Example of Associating Multiple Entities into a Single Entity

Figure 6:
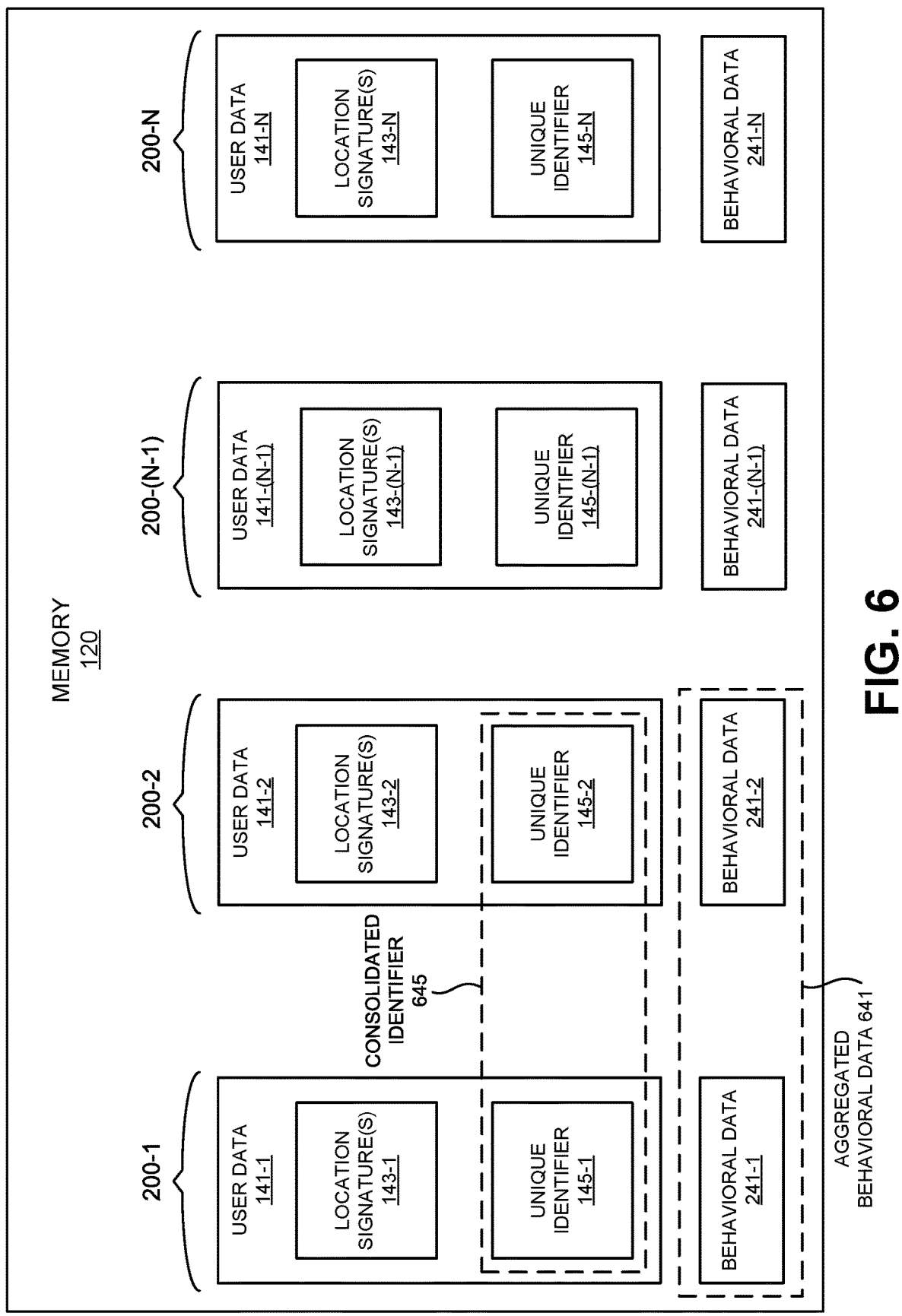
FIG. 6 shows a block diagram of example entity based groupings of data within memory of the server of FIG. 1 along with an association of a single entity with multiple electronic devices and an aggregation of behavioral data for the multiple electronic devices that are associated with the single entity, in accordance with various aspects of the present disclosure.

FIG. 6 shows a block diagram of example entity based groupings of data 200 within memory 120 of the server of FIG. 1 along with an association of a single entity (via consolidated identifier 645) with multiple electronic devices (and an aggregation of behavioral data for the multiple electronic devices that are associated with the single entity, in accordance with various aspects of the present disclosure. With reference to the example of FIG. 3A-3C, server 100 determines that electronic device 140-1 and electronic device 140-2 are often at or near the same location at the same time as one another. The location presence of electronic devices 140-1 and 140-2 overlaps enough, based the size of geo-polygon 333-3, that it exceeds a preset threshold utilized to filter out coincidental occurrences of electronic devices at or near the same location.

With reference to the example of FIGS. 3A-3C, in FIG. 6, server 100 determines, based on user data 141 (e.g., location signatures 143 and accompanying unique identifiers 145) accessed from electronic devices 140-1 and 140-2, that an intersection of location in place or place and time exists between electronic device 140-1 and 140-2 which each have unique identifiers 145 (145-1 and 145-2 respectively). This intersection occurs in multiple locations. Based on one or more of these intersections of locations, depending on threshold settings, server 100 creates a consolidated identifier 645 that it uses to associate a single entity 150 with the two unique identifiers 145-1 and 145-2. Put differently, without knowing the actual identity of either entity 150-1 or 150-2, server 100 associates them and determines that entity 150-1 and entity 150-2 are the same entity, for example, for purposes of targeting or retargeting advertising.

Based upon the association of unique identifiers 145-1 and 145-2 under consolidated identifier 645, server 100 aggregates behavioral data 241-1 of entity based data grouping 200-1 behavioral data 241-1 with behavioral data 241-2 of entity based data grouping 200-2 to form aggregated behavioral data 641 in memory 120. In some embodiments, the server can determine that different entities 150 are different persons that form a group with a relation of some kind, and the behavioral data may be handled accordingly.

With reference to the example of FIGS. 4A and 4B, server 100 can similarly create a consolidated identifier and similarly aggregated user data for electronic devices 140-1A, 140-1B, 140-1C, including or not user data for electronic device 140-2.

With reference to the example of FIGS. 5A-5C, server 100 can similarly create a consolidated identifier and similarly aggregated user data for electronic devices 140 utilized by entity 150-1 and 150-2.

Example Retargeting of Advertisement Between Electronic Devices

Figure 7:
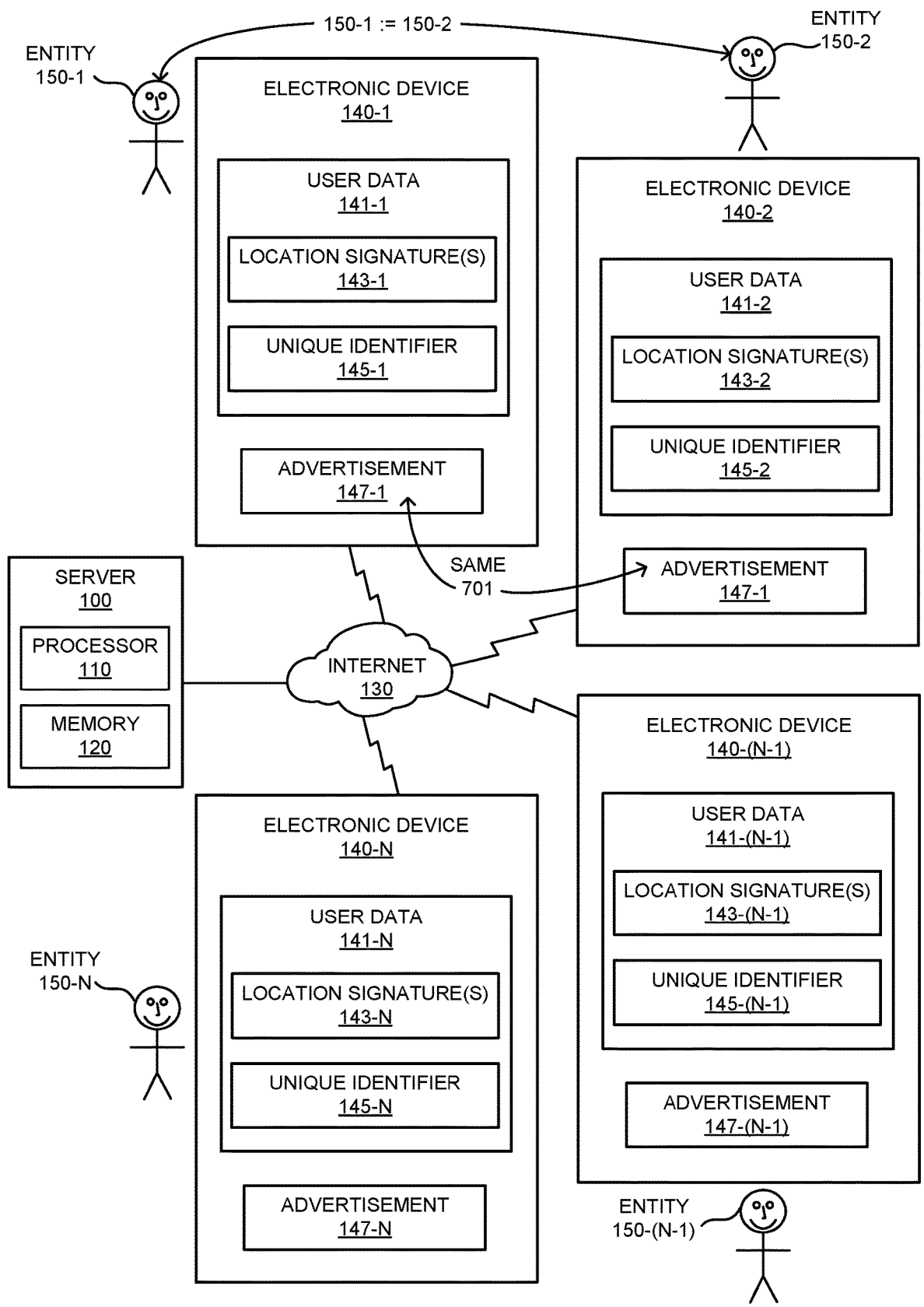
FIG. 7 shows a block diagram of an example server which is configured to access user data collected via internet communications with a plurality of electronic devices along with a retargeting of an advertisement from one electronic device that is associated with an entity to another electronic device that has been associated with the same entity, in accordance with various aspects of the present disclosure.

FIG. 7 shows a block diagram of an example server 100 which is configured to access user data collected via internet communications with a plurality of electronic devices 140 (140-1, 140-2 . . . 140-(N−1), 140-N) along with a retargeting of an advertisement 147-1 from one electronic device that is associated with an entity to another electronic device that has been associated with the same entity, in accordance with various aspects of the present disclosure. With reference to the example of FIGS. 3A-3C, after server 100 has defined with a predetermined level of confidence that entity 150-1 is the same as entity 150-2 for purposes of targeting and retargeting advertising, server 100 actively retargets and/or directs an advertising server or other computer system to retarget an advertisement, such as advertisement 147-1 from electronic device 140-1 to electronic device 140-2, as indicated by arrows 701. For example, an advertisement 147-1, for a refrigerator which was targeted to electronic device 140-1 based on internet searches conducted on electronic device 140-1, can be retargeted from electronic device 140-1 to electronic device 140-2. In one embodiment, this retargeting may occur in response to server 100 determining that electronic device 140-2 is at a particular location, such as at merchant 307, that sells a product, such as a refrigerator for which an advertisement can be retargeted.

With reference to the example of FIGS. 4A-4B, this can include retargeting advertisements that were initially directed at a first person to all the persons who operate electronic devices associated with a consolidated identifier. Server 100 may have no knowledge that more than one person has been consolidated into a single entity, only that the electronic devices overlap in location of use, and thus have been identified as being associated with a single entity even if they are being operated by multiple persons (e.g., a husband and a wife, a father and son, two roommates in an apartment, etc.).

Example Parsing of Aggregated Behavioral Data

Figure 8:
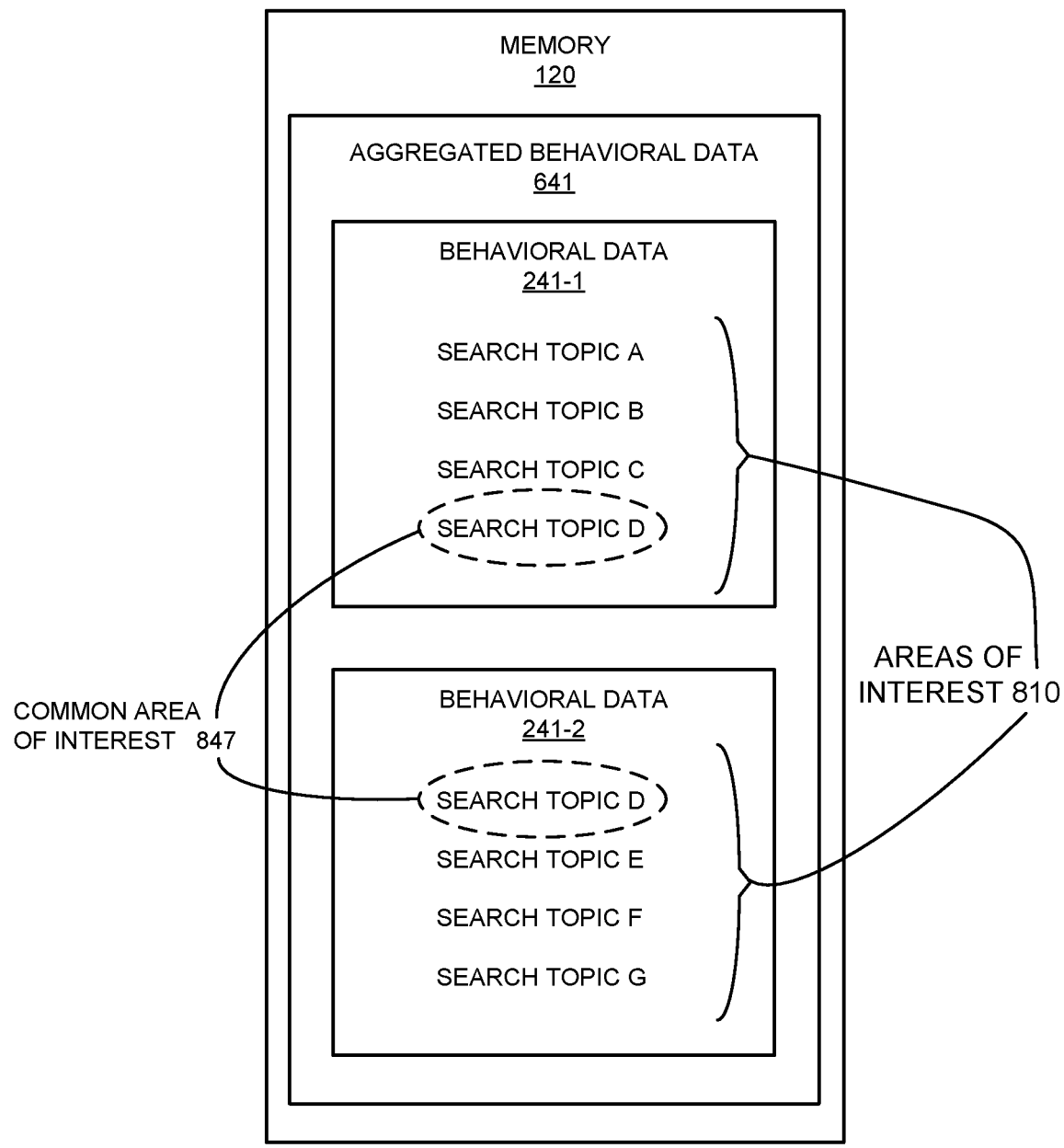
FIG. 8 illustrates an example of parsing aggregated behavioral data of multiple electronic devices that have been associated with a single entity to determine an area of interest of the single entity, in accordance with various aspects of the present disclosure.

FIG. 8 illustrates an example of parsing aggregated behavioral data 641 of multiple electronic devices (140-1 and 140-2) that have been associated with a single entity to determine an area of interest of the single entity, in accordance with various aspects of the present disclosure. As depicted, behavioral data 241-1 associated with electronic device 140-1 includes internet searches on search topics A, B, C, and D, while behavioral data 241-2 associated with electronic device 140-2 includes internet searches on search topics D, E, F, and G. Search topics A, B, C, D, E, F, and G are deemed as areas of interest 810 for the single entity that has been associated with electronic devices 140-1 and 140-2. Through parsing, server 100 discovers that the union of this aggregated behavioral data 641 is search topic D, which is a common area of interest 847. Server 100 then determines that an advertisement for a product, services, or the like related to search topic D is a common area of interest 847 of the multiple electronic devices 140 of the single entity to which the aggregated behavioral data belongs, and further determines that a single advertisement (e.g., advertisement 947 of FIG. 9) for a product, service, or the like related to the common area of interest 847 of search topic D can be targeted to both electronic device 140-1 and electronic device 140-2. For purposes of example only, search topic D, can be assumed to be a search for a 60-inch television. It should be appreciated that although search topics A, B, C, E, F, and G are not common areas of interest, they are areas of interest 810 and thus server 100 can similarly target an advertisement to both electronic device 140-1 and electronic device 140-2 for a product, service, or the like related to any one of these other areas of interest 810.

Example Targeting of Advertisement Based on Aggregated Interest

Figure 9:
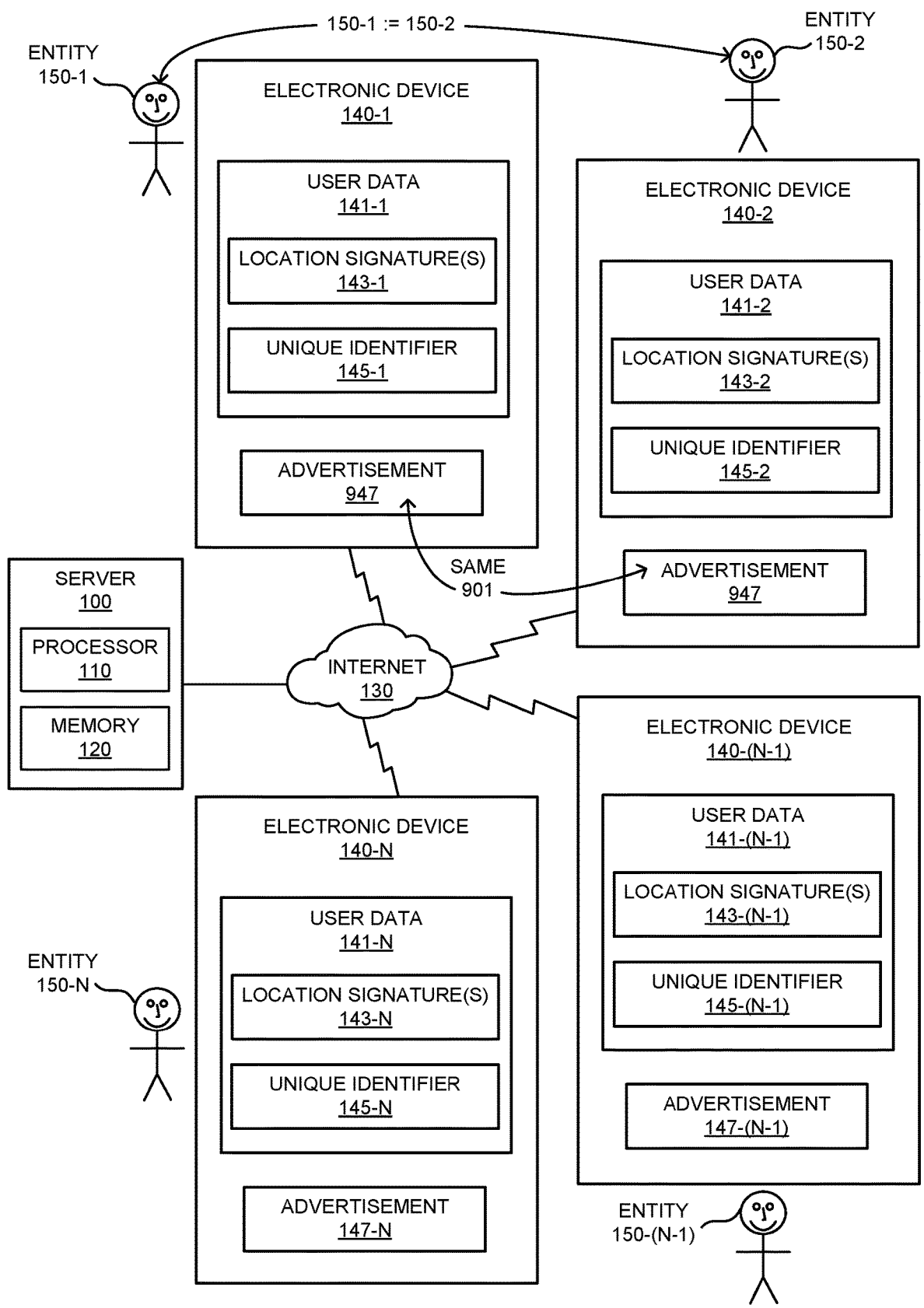
FIG. 9 illustrates an example of targeting a single advertisement to multiple electronic devices that have been associated with a single entity, wherein the advertisement is based on an interest determined by parsing aggregated behavioral data of the multiple electronic devices that have been associated with the single entity, in accordance with various aspects of the present disclosure.

FIG. 9 illustrates an example of targeting a single advertisement to multiple electronic devices that have been associated with a single entity, wherein the advertisement is based on an interest determined by parsing aggregated behavioral data of the multiple electronic devices that have been associated with the single entity, in accordance with various aspects of the present disclosure. As depicted in FIG. 9, server 100 actively targets and/or directs an advertising server or other computer system to target a single advertisement, such as advertisement 947 to both electronic device 140-1 and electronic device 140-2, as indicated by arrows 901. For example, an advertisement 947, for 60-inch television can targeted to electronic device 140-1 and to electronic device 140-2 based on the common area of interest 847 identified by parsing aggregated behavioral data 641. It should be appreciated that server 100 may similarly target advertisements based on the areas of interest 810 of any of search topics A, B, C, E, F, and G to both electronic device 140-1 and electronic device 140-2.

Example Methods of Operation

FIGS. 10A-10D illustrate a flow diagram 1000 of an example method of associating a single entity with multiple electronic devices, in accordance with various aspects of the present disclosure. Procedures of this method will be described with reference to elements and/or components of one or more of FIGS. 1-9. It is appreciated that in some embodiments, the procedures may be performed in a different order than described, that some of the described procedures may not be performed, and/or that one or more additional procedures to those described may be performed. Flow diagram 1000 includes some procedures that, in various embodiments, are carried out by one or more processors under the control of computer-readable and computer-executable instructions that are stored on non-transitory computer-readable storage media (e.g., processor 110, memory 120, or the like). While the processor(s) may belong to a server, such as server 100 in some embodiments, it is appreciated that one, more, or all of the processors may belong to one or more other computer systems. It is further appreciated that one or more procedures described in flow diagrams 1000 may be implemented in hardware, or a combination of hardware with firmware and/or software. It should also be noted that, in some embodiments, the procedures in flow diagram 1000 may be performed in a distributed fashion by where two or more computer systems may carry out the procedures by splitting the procedures up and/or by cooperatively performing aspects of a procedure.

With reference to FIG. 10A, at procedure 1010 of flow diagram 1000, in various embodiments, a server accesses user data collected via internet communications with a plurality of electronic devices, wherein each item of user data includes a location signature and a unique identifier. As discussed above in FIGS. 1-5C this can comprise server 100 or processor 110 accessing user data 141 from a plurality of electronic devices 140 via communications over the Internet 130. The communications can be direct communications where server 100 actively communicates with one or more of the electronic devices 140. The communications can also be indirect where server 100 accesses data that other servers or computer systems have compiled via internet communications with one or more electronic devices 140.

With continued reference to FIG. 10A, at procedure 1020 of flow diagram 1000, in various embodiments, the server determines an intersection of location between two electronic devices of the plurality of electronic devices based on the user data accessed from the two electronic devices, wherein the user data accessed from a first of the two electronic devices has a first unique identifier that is different than a second unique identifier of the user data accessed from a second of the two electronic devices. As discussed above in FIGS. 1-5C this can comprise server 100 or processor 110 comparing various location signatures 143 of electronic devices 140 that have distinct unique identifiers 145 from one another. In some embodiments, server 100 may determine that two electronic devices share the same MAC address as a location signature 143 have an intersection of location. In some embodiments, server 100 may determine that two electronic devices share the same IP address as a location signature 143 have an intersection of location. In some embodiments, server 100 may determine that two electronic devices 140 share the same geographic location as a location signature 143 have an intersection of location. In some embodiments server 100 may create one or more geo-polygons associated with location signatures 143 from separate electronic devices 140 and determine that two electronic devices 140 have an intersection of location when their respective associated geo-polygons intersect to an extent meeting or exceeding a predetermined confidence level (e.g., a 30% intersection, a 70% intersection, a 90% intersection, or some other threshold confidence percentage of intersection). In some embodiments, filtering may be done to select and use location signatures with a certain accuracy or low uncertainty. In some embodiment server 100 may create clusters of location signatures 143 from separate electronic devices 140 and determine an overlap of clusters from two electronic devices 140, where the overlap may be expressed as a geo-polygon.

With continued reference to FIG. 10A, at procedure 1030 of flow diagram 1000, in various embodiments, based on the intersection of location, associating a single entity with both the first unique identifier and the second unique identifier. As discussed above in FIGS. 1-6 this can comprise server 100 or processor 110 associating a single entity 150 with both unique identifier 145-1 and unique identifier 145-2. This single identity is represented in FIG. 6 by consolidated identifier 645 and in FIG. 7 by the arrow between entity 150-1 and entity 150-2 that defines entity 150-1 as equal to entity 150-2. It should be appreciated that this single entity identification may be maintained on server 100, shared with other servers or computer systems, or pushed out to one or more of the client electronic devices 140 that have been associated with the single entity. When pushed out to clients or other servers or computer systems, this allows for other computer systems to determine other electronic devices 140 to which advertisements that are initially targeted to a single electronic device may be targeted or retargeted. Moreover, if an entity such as entity 150-1 ever affirmatively identifies itself, such as using a known login, such as to a search engine or social media platform, the identity of entity 150-1 can then be attributed to the other entities 150 and electronic devices 140 that have been associated with the single entity.

With reference to FIG. 10B, at procedure 1040 of flow diagram 1000, in various embodiments, the method as described in 1010-1030 further comprises, server 100, processor 110, or some other server or computer system utilizing the single entity association to retarget advertising, that was initially targeted to the first electronic device with the first unique identifier (e.g., electronic device 140-1 with unique identifier 145-1), to a second electronic device which provided the user data with the second unique identifier (e.g., electronic device 140-2 with unique identifier 145-2). This retargeting of an advertisement 147 is described and depicted in conjunction with FIG. 7, where advertisement 147-1 has been retargeted from electronic device 140-1 (which has unique identifier 145-1) to electronic device 140-2 (which has unique identifier 145-2) due to entities 150-1 and 150-2 being associated as a single entity. For example, in some embodiments, the initial advertisement may have been targeted based on online search activity associated with the first unique identifier 145-1, offline activity associated with the first unique identifier 145-1, or some combination. Offline activity may include uses of an electronic application on an electronic device 140-1 which does not cause or require a connection with the Internet and/or activity such as one or more geographic locations, as noted from beacon scans, GNSS data, or the like, in which location signatures 143 have indicated the presence of electronic device 140-1.

Figure 10C:
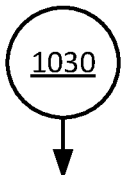

With reference to FIG. 10C, at procedure 1050 of flow diagram 1000 in various embodiments, the method as described in 1010-1030 further comprises, aggregating first stored behavioral data of the first unique identifier with second stored behavioral data of second unique identifier to create an aggregated behavioral data for the single entity. This can comprise aggregating online and/or offline activates of the electronic devices 140 that are associated with the single entity to create a consolidated profile for the single entity. For example, as depicted in server 100 aggregates behavioral data 241-1 with behavioral data 241-2 to form aggregated behavioral data 641. As depicted and described in conjunction with FIG. 8, server 100 may parse this aggregated behavioral data to determine one or more areas of interest 810 or a common area of interest 847 of the single entity. As depicted and described in conjunction with FIG. 9, server 100 may then target or direct targeting of a single advertisement, based an area of interest 810 or common area of interest 847, to both the first electronic device 140 (e.g., 140-1) and the second electronic device 140 (e.g., 140-2) that are associated with the single entity. The single entity 150 may comprise a plurality of users, and an advertisement may be target to one or more of these users based on the users' behavioral data and/or profile.

Figure 10D:
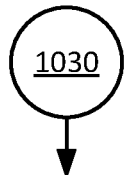

With reference to FIG. 10D, at procedure 1060 of flow diagram 1000, in various embodiments, the method as described in 1010-1030 further comprises, the server 100 or processor 110 filtering the overall set of user data 141 (e.g., user data 141-1 to 141-n) to remove instances of user data with a location signature that does not meet at least one predefined criterion. In some embodiments, a filtering criterion may be based on time, such that location signatures 143 with that are separated by more than a certain amount such as 30 seconds or 5 minutes from one another are filtered out of the overall set of user data 141. In some embodiments, a filtering criterion may be based on geo-location, such that an electronic device 140 that has a location signature or set of location signatures that have no overlap with a location signature 143 of at least one other electronic device 140 is filtered out of the overall set of user data 141. In some embodiments, a filtering criterion may be based on dwell time, such that location signatures 143 that do not persist at a location for more than a certain amount of time, such as 3 seconds, or 20 seconds, or 1 minute, are filtered out of the set of user data. In some embodiments, lack of repetition may be utilized to filter out of the overall set of user data 141 any location signature 143 for an electronic device 140 that does not recur a certain number of times such as twice or three times within a predetermined period of time such as within 1 hour, 8 hours, 24 hours, 3 days, etc. In some embodiments, the overall set of user data 141 may also be filtered after creation of geo-polygons. For example, in some embodiments, a filtering criterion may be percentage of overlap of geo-polygons such that location signatures 143 associated with geo-polygons that do not overlap with another geo-polygon by at least some threshold percentage are filtered out.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many examples described the application of retargeting advertisements from and to the different device associated with the single entity, but once the different devices are associated with the entity, the association may be beneficial to other types of applications and communications also. For example, a user may receive a message or notification on one device, but the user is not using or close to the device. Then, the server may direct the message or notification to another device associated with the user that the user is actively using. The appropriate device may be determined based on e.g., the received location signatures, or sensors in the device indicating that the user is actively using the device or is in close proximity. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of associating a single entity with multiple electronic devices, said method comprising:
accessing, by a server, user data collected via internet communications with a plurality of electronic devices, wherein each item of user data includes a location signature which includes geolocation data and a unique identifier;
determining, by said server, an intersection of location between two electronic devices of said plurality of electronic devices based on said user data accessed from said two electronic devices by:
creating, by said server, geo-polygons from said geolocation data of said location signatures of said user data accessed from said two electronic devices; and
determining, by said server, said intersection between geo-polygons of said user data accessed from a first of said two electronic devices and said user data accessed from a second of said two electronic devices, wherein said user data accessed from a first of said two electronic devices has a first unique identifier that is different than a second unique identifier of said user data accessed from a second of said two electronic devices;
based on said intersection of location, associating a single entity with both said first unique identifier and said second unique identifier; and
based on a geographic extent of said intersection, determining a confidence level of the association.

2. The method as recited in claim 1, further comprising:
utilizing said single entity association to retarget advertising from said first electronic device to said second electronic device, wherein said advertising is based on an activity associated with user data of said first unique identifier.

3. The method as recited in claim 1, further comprising:
aggregating first stored behavioral data of said first unique identifier with second stored behavioral data of said second unique identifier to create an aggregated behavioral data for said single entity.

4. The method as recited in claim 3, further comprising:
parsing said aggregated behavioral data to determine an interest of said single entity.

5. The method as recited in claim 4, further comprising:
targeting a single advertisement to both said first electronic device and said second electronic device based on said interest.

6. The method as recited in claim 1, further comprising:
filtering said user data to remove user data with a location signature that does not meet at least one predefined criterion.

7. The method as recited in claim 1, wherein said creating, by said server, of said geo-polygons comprises:
creating said geo-polygons using a clustering technique.

8. The method as recited in claim 1, wherein said determining, by said server, of said intersection further comprises:
determining candidate geo-polygons by filtering said geo-polygons based on at least one attribute of said geo-polygons.

9. The method as recited in claim 8, wherein said determining candidate geo-polygons by filtering said geo-polygons based on at least one attribute of said geo-polygons comprises:

determining candidate geo-polygons by filtering said geo-polygons based on at least one attribute of said geo-polygons selected from the list of attributes consisting of: a location of a geo-polygons of said geo-polygons; and a dimension of a geo-polygon of said geo-polygons.

10. The method as recited in claim 1, wherein based on said intersection of location, associating a single entity with both said first unique identifier and said second unique identifier comprises:
associating said single entity with said first unique identifier and said second unique identifier responsive to said intersection of location meeting a predetermined intersection threshold.

11. The method as recited in claim 10, wherein said associating said single entity with said first unique identifier and said second unique identifier responsive to said intersection of location meeting a predetermined intersection threshold comprises:
associating said single entity with said first unique identifier and said second unique identifier responsive to said intersection of location meeting said predetermined intersection threshold wherein said confidence level is based on the number of intersections of location.

12. The method as recited in claim 10, wherein said intersection of location comprises a plurality of intersections of location.

13. A non-transitory computer readable storage medium having computer-executable instructions stored thereon for causing a computer system to perform a method of associating a single entity with multiple electronic devices, said method comprising:
accessing, by a server, user data collected via internet communications with a plurality of electronic devices, wherein each item of user data includes a location signature which includes geolocation data and a unique identifier;
determining, by said server, an intersection of location between two electronic devices of said plurality of electronic devices based on said user data accessed from said two electronic devices by:
creating, by said server, geo-polygons from said geolocation data of said location signatures of said user data accessed from said two electronic devices; and
determining, by said server, said intersection between geo-polygons of said user data accessed from a first of said two electronic devices and said user data accessed from a second of said two electronic devices, wherein said user data accessed from a first of said two electronic devices has a first unique identifier that is different than a second unique identifier of said user data accessed from a second of said two electronic devices;
based on said intersection of location, associating a single entity with both said first unique identifier and said second unique identifier; and
based on a geographic extent of said intersection, determining a confidence level of the association.

14. The non-transitory computer readable storage medium of claim 13, wherein said method further comprises:
utilizing said single entity association to retarget advertising from said first electronic device to said second electronic device, wherein said advertising is based on an activity associated with user data of said first unique identifier.

15. A server comprising:
a memory configured to store user data collected via internet communications with a plurality of electronic devices, wherein each item of user data includes a location signature which includes geolocation data and a unique identifier;
a processor configured to:
  access said user data;
  store said user data in said memory;
  determine an intersection of location between two electronic devices of said plurality of electronic devices based on said user data accessed from said two electronic devices by:
    creating, by said server, geo-polygons from said geolocation data of said location signatures of said user data accessed from said two electronic devices; and
    determining, by said server, said intersection between geo-polygons of said user data accessed from a first of said two electronic devices and said user data accessed from a second of said two electronic devices, wherein said user data accessed from a first electronic device of said two electronic devices has a first unique identifier that is different than a second unique identifier of said user data accessed from a second electronic device of said two electronic devices;
  associate a single entity with both said first unique identifier and said second unique identifier based on said intersection of location; and
  based on a geographic extent of said intersection, determining a confidence level of the association.

16. The server of claim 15, wherein said processor is further configured to:
utilize said single entity association to retarget advertising from said first electronic device to said second electronic device, wherein said advertising is based on an activity associated with user data of said first unique identifier.

17. The server of claim 15, wherein said processor is further configured to:
aggregate first stored behavioral data of said first unique identifier with second stored behavioral data of second unique identifier to create an aggregated behavioral data for said single entity.

18. The server of claim 17, wherein said behavioral data includes a combination of online and offline behavior.

19. The server of claim 17, wherein said processor is further configured to:
parse said aggregated behavioral data to determine an interest of said single entity.

20. The server of claim 19, wherein said processor is further configured to:
target a single advertisement to both said first electronic device and said second electronic device based on said interest.

21. The server of claim 15, wherein said processor is further configured to:
filter said user data to remove user data with a location signature that does not meet a predefined criterion.

22. The server of claim 15, wherein said geo-polygons are created using a clustering technique.

23. The server of claim 15, wherein said processor is further configured to:
determine candidate geo-polygons by filtering said geo-polygons based on at least one attribute of said geo-polygons.

24. The server of claim 23, wherein at least one attributed comprises one a location of a geo-polygons of said geo-polygons and a dimension of a geo-polygon of said geo-polygons.

25. The server of claim 15, wherein said processor is configured to associate a single entity with both said first unique identifier and said second unique identifier based on said intersection of location comprises said processor further being configured to:
associate said single entity with said first unique identifier and said second unique identifier responsive to said intersection of location meeting a predetermined intersection threshold.

* * * * *